United States Patent
Khatri et al.

(10) Patent No.: US 11,843,707 B2
(45) Date of Patent: Dec. 12, 2023

(54) SYSTEMS AND METHODS FOR AUTHENTICATING HARDWARE OF AN INFORMATION HANDLING SYSTEM

(71) Applicant: Dell Products, L.P., Round Rock, TX (US)

(72) Inventors: Mukund P. Khatri, Austin, TX (US); Eugene David Cho, Austin, TX (US)

(73) Assignee: Dell Products, L.P., Round Rock, TX (US)

( * ) Notice: Subject to any disclaimer, the term of this patent is extended or adjusted under 35 U.S.C. 154(b) by 101 days.

(21) Appl. No.: 17/372,779

(22) Filed: Jul. 12, 2021

(65) Prior Publication Data
US 2023/0010345 A1    Jan. 12, 2023

(51) Int. Cl.
*H04L 9/32*     (2006.01)
*G06F 21/73*    (2013.01)

(52) U.S. Cl.
CPC ............ *H04L 9/3268* (2013.01); *G06F 21/73* (2013.01)

(58) Field of Classification Search
CPC ..... H04L 9/3268; H04L 9/321; H04L 9/3247; G06F 21/73; G06F 21/575; G06F 21/44; G09C 1/00
See application file for complete search history.

(56) References Cited

U.S. PATENT DOCUMENTS

| | | | |
|---|---|---|---|
| 10,880,099 B2* | 12/2020 | Kumar Ujjwal | G06F 21/577 |
| 2012/0131652 A1* | 5/2012 | Anand | H04L 63/0823 726/5 |
| 2015/0244707 A1* | 8/2015 | Bowen | H04L 9/30 713/158 |
| 2017/0012786 A1* | 1/2017 | Gallagher | H04L 63/062 |
| 2018/0097639 A1* | 4/2018 | Gulati | H04L 9/3268 |
| 2020/0044868 A1* | 2/2020 | Vakulenko | G06F 21/305 |

FOREIGN PATENT DOCUMENTS

CN     112084484 A  * 12/2020  ............ G06F 21/44

* cited by examiner

*Primary Examiner* — Carl G Colin
*Assistant Examiner* — Hany S. Gadalla
(74) *Attorney, Agent, or Firm* — Fogarty LLP

(57) ABSTRACT

As part of a factory provisioning of an Information Handling System (IHS), a signed replaceable hardware certificate is stored that identifies any replaceable hardware components coupled to the IHS during the factory provisioning. Upon a transfer of control or ownership of the IHS, replaceable hardware components that are coupled to the IHS are detected, and the replaceable hardware certificate is utilized to validate that the identified replaceable hardware components detected as coupled to the IHS are the same replaceable hardware components coupled to the IHS during the factory provisioning. A security processor of the IHS may support boot code operations for generating additional replaceable hardware certificates that can be used to validate the integrity of any changes the replaceable hardware of the IHS, such as upon its next power cycle.

20 Claims, 10 Drawing Sheets

SYSTEMS AND METHODS FOR AUTHENTICATING HARDWARE OF AN INFORMATION HANDLING SYSTEM

FIELD

The present disclosure relates generally to Information Handling Systems (IHSs), and more particularly, to systems and methods for validating components of an IHS.

BACKGROUND

As the value and use of information continue to increase, individuals and businesses seek additional ways to process and store it. One option available to users is Information Handling Systems (IHSs). An IHS generally processes, compiles, stores, and/or communicates information or data for business, personal, or other purposes thereby allowing users to take advantage of the value of the information. Because technology and information handling needs and requirements vary between different users or applications, IHSs may also vary regarding what information is handled, how the information is handled, how much information is processed, stored, or communicated, and how quickly and efficiently the information may be processed, stored, or communicated.

Variations in IHSs allow for IHSs to be general or configured for a specific user or specific use such as financial transaction processing, airline reservations, enterprise data storage, or global communications. In addition, IHSs may include a variety of hardware and software components that may be configured to process, store, and communicate information and may include one or more computer systems, data storage systems, and networking systems.

SUMMARY

In various embodiments, security processors installed in an IHS (Information Handling System) may include: a logic unit; and a memory coupled to the logic unit, the memory having program instructions stored thereon that, upon execution by the logic unit, cause the security processor to, as part of a factory provisioning of the IHS, store a first signed replaceable hardware certificate that identifies any replaceable hardware components coupled to the IHS during the factory provisioning, and upon a transfer of control or ownership of the security processor, identify replaceable hardware components detected as coupled to the IHS; and utilize the first signed replaceable hardware certificate to validate that the identified replaceable hardware components detected as coupled to the IHS are the same replaceable hardware components coupled to the IHS during the factory provisioning.

In some security processor embodiments, upon the transfer of control or ownership of the security processor, the execution of the instructions by the logic unit further causes the security processor to: detect a change to the replaceable hardware coupled to the IHS; and initiate boot code operations for generating a second replaceable hardware certificate that identifies the changed replaceable hardware components coupled to the IHS. In some security processor embodiments, the second replaceable hardware certificate is signed by an embedded certificate authority of the security processor. In some security processor embodiments, upon the transfer of control or ownership of the security processor, the execution of the instructions by the logic unit further causes the security processor to: store the second replaceable hardware certificate for use in validating the authenticity of the replaceable hardware detected as coupled to the IHS upon its next power cycle. In some security processor embodiments, the replaceable hardware components specified in the first signed replaceable hardware certificate are identified based on at least one of part numbers and model numbers assigned to the respective hardware components. In some security processor embodiments, during a trusted administration of the IHS by an owner of the IHS, the execution of the instructions by the logic unit further causes the security processor to: store a signed third replaceable hardware certificate that identifies replaceable hardware components coupled to the IHS during the trusted administration. In some security processor embodiments, the second replaceable hardware certificate is generated based on instructions validated based on security credentials imported to the IHS by the renter. In some security processor embodiments, the security credentials are imported by the renter based on validation of the IHS being factory provisioned to support secure transfer of security credentials by the renter. In some security processor embodiments, the owner of the IHS comprises a manufacturer of the IHS.

In various additional embodiments, memory storage devices include program instructions stored thereon that, upon execution by an Information Handling System (IHS), cause the IHS to, as part of a factory provisioning of the IHS, store a first signed replaceable hardware certificate that identifies any replaceable hardware components coupled to the IHS during the factory provisioning, and upon a transfer of control or ownership of the IHS, identify replaceable hardware components detected as coupled to the IHS; and utilize the first signed replaceable hardware certificate to validate that the identified replaceable hardware components detected as coupled to the IHS are the same replaceable hardware components coupled to the IHS during the factory provisioning.

In some memory storage device embodiments, upon the transfer of control or ownership of the IHS, the execution of the instructions by the logic unit further causes the IHS to: detect a change to the replaceable hardware coupled to the IHS; and initiate boot code operations for generating a second replaceable hardware certificate that identifies the changed replaceable hardware components coupled to the IHS. In some memory storage device embodiments, the second replaceable hardware certificate is signed by an embedded certificate authority of a security processor of the IHS. In some memory storage device embodiments, upon the transfer of control or ownership of the IHS, the execution of the instructions by the logic unit further causes the IHS to: store the second replaceable hardware certificate for use in validating the authenticity of the replaceable hardware detected as coupled to the IHS upon its next power cycle. In some memory storage device embodiments, the replaceable hardware components specified in the first signed replaceable hardware certificate are identified based on at least one of part numbers and model numbers assigned to the respective hardware components. In some memory storage device embodiments, during a trusted administration of the IHS by an owner of the IHS, the execution of the instructions by the logic unit further causes the IHS to: store a signed third replaceable hardware certificate that identifies replaceable hardware components coupled to the IHS during the trusted administration.

In various additional embodiments, methods are provided for securing an Information Handling System (IHS), where the methods may include, as part of a factory provisioning of the IHS, storing a first signed replaceable hardware certificate that identifies any replaceable hardware components coupled to the IHS during the factory provisioning; and upon a transfer of control or ownership of the IHS, identifying replaceable hardware components detected as coupled to the IHS; and utilizing the first signed replaceable hardware certificate to validate that the identified replaceable hardware components detected as coupled to the IHS are the same replaceable hardware components coupled to the IHS during the factory provisioning.

In some method embodiments, upon the transfer of control or ownership of the IHS, detecting a change to the replaceable hardware coupled to the IHS and initiating boot code operations for generating a second replaceable hardware certificate that identifies the changed replaceable hardware components coupled to the IHS. In some method embodiments, the second replaceable hardware certificate is signed by an embedded certificate authority of a security processor of the IHS. In some method embodiments, upon the transfer of control or ownership of the IHS, storing the second replaceable hardware certificate for use in validating the authenticity of the replaceable hardware detected as coupled to the IHS upon its next power cycle. In some method embodiments, during a trusted administration of the IHS by an owner of the IHS, storing a signed third replaceable hardware certificate that identifies replaceable hardware components coupled to the IHS during the trusted administration.

BRIEF DESCRIPTION OF THE DRAWINGS

The present invention(s) is/are illustrated by way of example and is/are not limited by the accompanying figures, in which like references indicate similar elements. Elements in the figures are illustrated for simplicity and clarity, and have not necessarily been drawn to scale.

DETAILED DESCRIPTION

In this disclosure, an Information Handling System (IHS) may include any instrumentality or aggregate of instrumentalities operable to compute, calculate, determine, classify, process, transmit, receive, retrieve, originate, switch, store, display, communicate, manifest, detect, record, reproduce, handle, or utilize any form of information, intelligence, or data for business, scientific, control, or other purposes. For example, an IHS may be a personal computer (e.g., desktop or laptop), tablet computer, mobile device (e.g., Personal Digital Assistant (PDA) or smart phone), server (e.g., blade server or rack server), a network storage device, or any other suitable device and may vary in size, shape, performance, functionality, and price.

An IHS may include Random Access Memory (RAM), one or more processing resources such as a Central Processing Unit (CPU) or hardware or software control logic, Read-Only Memory (ROM), and/or other types of nonvolatile memory. Additional components of an IHS may include one or more disk drives, one or more network ports for communicating with external devices as well as various I/O devices, such as a keyboard, a mouse, touchscreen, and/or a video display. An IHS may also include one or more buses operable to transmit communications between the various hardware components.

Figure 1:
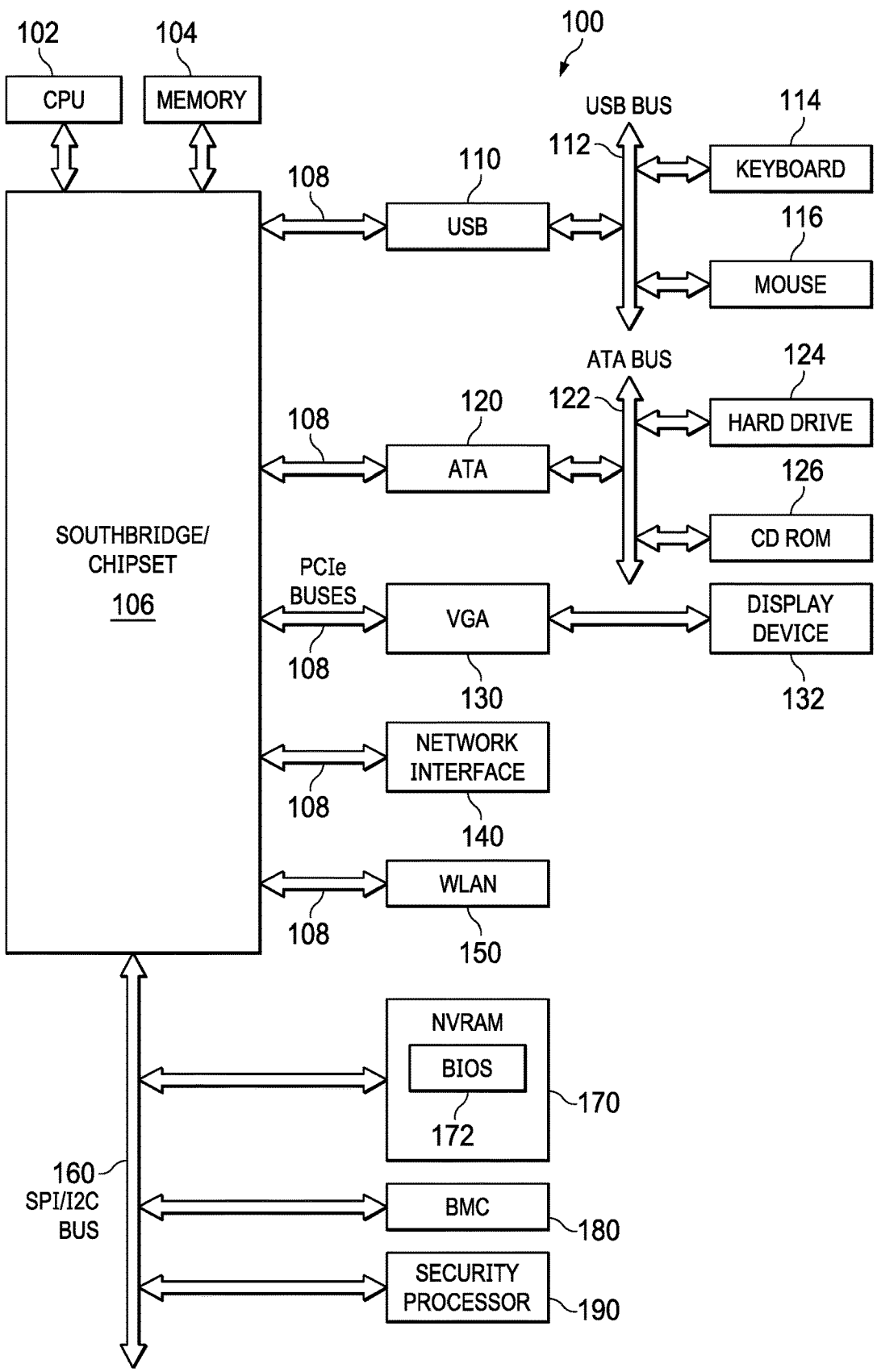
FIG. 1 is a block diagram of an example of hardware components of an Information Handling System (IHS) configured according to some embodiments.

FIG. 1 is a block diagram of an example of hardware components of IHS 100 configured according to some embodiments. As shown, IHS 100 includes processor 102, memory 104, southbridge/chipset 106, one or more Peripheral Component Interconnect-Express (PCIe) buses 108, Universal Serial Bus (USB) controller 110, USB bus 112, keyboard device controller 114, mouse device controller 116, Advanced Technology Attachment (ATA) bus controller 120, ATA bus 122, hard drive device controller 124, compact disk read only memory (CD ROM) device controller 126, Video Graphics Array (VGA) device controller 130, Network Interface Controller (NIC) 140, Wireless Local Area Network (WLAN) controller 150, Serial Peripheral Interface (SPI) bus 160, non-volatile RAM (NVRAM) 170 for storing Basic Input/Output System (BIOS) or Unified Extensible Firmware Interface (UEFI) 172, Baseboard Management Controller (BMC) 180, and security processor 190.

Chipset 106 may be directly connected to an individual endpoint via a PCIe root port within chipset 106 and a point-to-point topology as shown in FIG. 1. BMC 180 may be referred to as a service processor or embedded controller (EC). Capabilities and operations provided by BMC 180 can vary considerably based on the type of IHS 100. For example, the term BMC is often used to describe an embedded processor included in a server, while an EC is more likely to be found in a consumer-level device. Moreover, an EC included in a data storage system may be referred to as a storage enclosure processor. As disclosed herein, BMC 180 represents a processing device different from CPU 102, which provides various management operations for IHS 100. For example, an EC may be responsible for power management, cooling management, and the like. Moreover, BMC 180 may be configured to provide out-of-band access to devices at IHS 100. As used herein, out-of-band access herein refers to operations performed prior to execution of BIOS 172 by processor 102 to initialize operation of IHS 100.

IHS 100 may include additional processors that are configured to provide localized or specific control operations, such as a battery management controller. Bus 160 may include one or more busses, including a SPI bus, an I²C bus, a system management bus (SMBUS), a power management bus (PMBUS), and the like.

BIOS 172 may be referred to as a firmware image. BIOS 172 includes instructions executable by CPU 102 to initialize and test the hardware components of IHS 100, and to load a boot loader or an operating system (OS) from a mass storage device. BIOS 172 additionally provides an abstraction layer for the hardware, such as a consistent way for application programs and OSs to interact with the keyboard, display, and other input/output devices. When power is first applied to IHS 100, IHS 100 begins a sequence of initialization procedures. During the initialization sequence, also referred to as a boot sequence, components of IHS 100 are configured and enabled for operation, and device drivers can be installed. Device drivers provide an interface through which other components of IHS 100 can communicate with a corresponding device. As described in additional detail below, the boot sequence that is utilized by IHS 100 may include procedures that validate the authenticity of the motherboard and chassis of the IHS as being the same motherboard and chassis that were installed during manufacture of the IHS.

IHS 100 may include multiple processor cores, audio devices, and the like. While a particular arrangement of bus technologies and interconnections is illustrated for the purpose of example, a person of ordinary skill in the art will appreciate that the techniques disclosed herein are applicable to other IHS architectures. IHS 100 may include multiple CPUs and redundant bus controllers. One or more components may be integrated together. For example, portions of southbridge/chipset 106 may be integrated within CPU 102.

Additional components of IHS 100 may include one or more replaceable storage devices that can store machine-executable code, one or more communications ports for communicating with external devices, and various I/O devices, such as a keyboard, a mouse, and a video display. An example of IHS 100 includes a multi-tenant chassis system where groups of tenants (users) share a common chassis, and tenant has a unique set of resources assigned thereto. The replaceable resources of a chassis can include blade servers of the chassis, I/O modules, PCIe cards, storage controllers, and the like. IHS 100 may include a set of instructions that can be executed to cause it to perform any one or more of the methods or computer-based operations disclosed herein. IHS 100 may operate as a standalone device or may be connected to other computer systems or peripheral devices, such as by a network.

In a networked deployment, IHS 100 may operate in the capacity of a server or as a client user computer in a server-client user network environment, or as a peer computer system in a peer-to-peer (or distributed) network environment. IHS 100 may also be implemented as or incorporated into various devices, such as a personal computer (PC), a tablet PC, a set-top box (STB), a personal digital assistant (PDA), a mobile device, a palmtop computer, a laptop computer, a desktop computer, a communications device, a wireless telephone, a land-line telephone, a control system, a camera, a scanner, a facsimile machine, a printer, a pager, a personal trusted device, a web appliance, a network router, switch or bridge, or any other machine capable of executing a set of instructions (sequential or otherwise) that specify actions to be taken by that machine. In a particular embodiment, IHS 100 may be implemented using electronic devices that provide voice, video, or data communication.

IHS 100 may include a replaceable disk drive unit and may include a computer-readable medium in which one or more sets of instructions, such as software, can be embedded. Further, the instructions may implement one or more of the methods described herein. In a particular embodiment, these instructions may reside completely, or at least partially, within memory 104 or another memory included in IHS 100, and/or within CPU 102 during execution by IHS 100. System memory 104 and CPU 102 also may include computer-readable media.

Security processor 190 may be used to establish a hardware Root of Trust (RoT) within components of IHS 100. As used herein, the term RoT generally refers to one or more hardware components that operate using instructions that have been validated with regard to their authenticity and/or integrity. In the described embodiments, security processor 190 may implement boot processes that operate using code from an immutable source. Because the anchor for the root of trust is established by the security processor 190 using immutable source code, the root of trust cannot be modified by unauthorized parties. Upon the IHS being booted, the security processor 190 executes self-tests and validation of its own firmware. If these tests pass, security processor 190 may then validate additional code to be used by the security processor, or by other components of the IHS, thus expanding the root of trust.

As described below, when security processor 190 is initialized during factory provisioning, it may utilize code within the established root of trust in order to derive one or more internal keys from device identity inputs, where these keys may be used once the IHS has been deployed in the validation of various hardware and software components of the IHS. Also as described below, security processor 190 may also utilize code that operates within the established root of trust to authorize a renter of the IHS 100 to inject their own cryptographic keys or other security credentials for use by the security processor 190, thus allowing the renter to utilize their own credentials in establishing their own root of trust in the IHS. Also as described below, these capabilities that allow renters to validate the identity of the motherboard and chassis and to establish their own root of trust in the IHS may be utilized by embodiments in validating the authenticity of replaceable hardware components coupled to the IHS by the owner or by the renter.

In existing systems, some of the capabilities of security processor 190 may be fulfilled by a Trusted Platform Module (TPM). The TPM is a hardware component used to help securely store keys and measurements that verify the integrity of the system. Although computer programs may use a TPM to authenticate hardware devices, the firmware instructions that are used by a TPM are not programmable or customizable. In contrast with existing TPMs, when IHS 100 is powered up, security processor 190 executes firmware instructions located in an embedded read-only memory of the security processor. During its fabrication, one more protected memory devices that are accessible by security processor 190 are programmed with immutable code, sometimes known as the boot ROM, that may be trusted implicitly, but that may also be expressly validated using a provided reference signature. In some instances, security processor 190 may run a Memory Built-In Self-Test (MBIST) on every boot to ensure that memory used by the processor in establishing the root of trust (including the boot ROM) has not been tampered with. If the integrity of the boot code is confirmed, security processor 190 may load the boot code firmware from memory.

Figure 2:
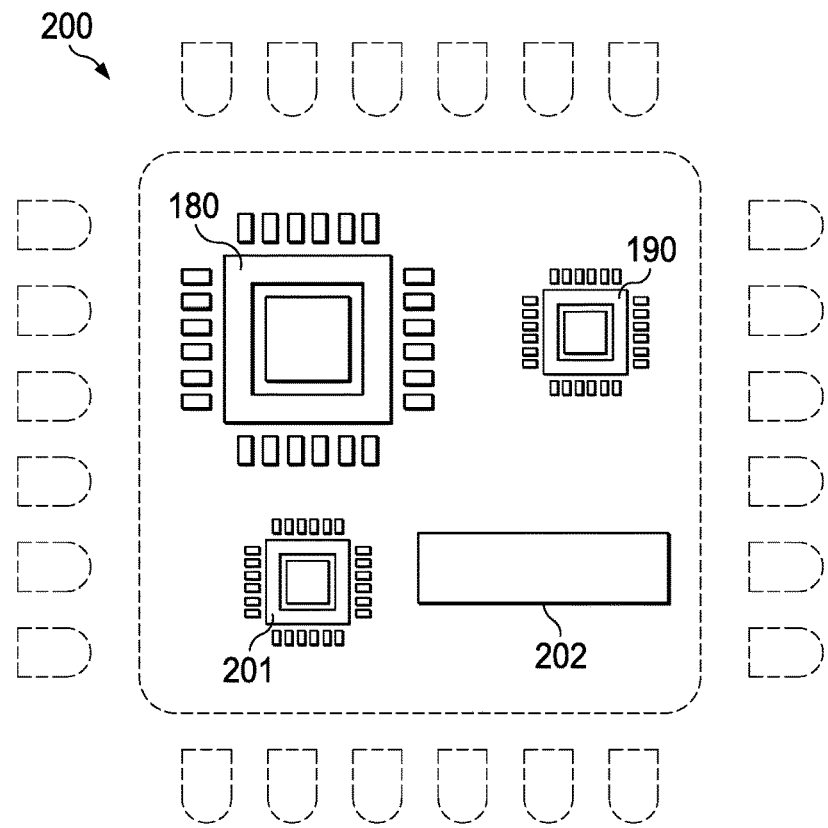
FIG. 2 is a diagram of a chip comprising a security processor, according to some embodiments.

FIG. 2 is a diagram of an example of security chip 200 comprising security processor 190, according to some embodiments. As illustrated, chip 200 may be coupled (e.g., soldered) to a motherboard hosting other components of IHS 100 (e.g., CPU 102, etc.). Security chip 200 may include security processor or core 190, BMC 180, offload CPU or hardware accelerator 201, and MROM 202 containing immutable code. In different implementations, security chip 200 may be manufactured as a Systems-On-Chip (SoC), Field-Programmable Gate Array (FPGA), Application-Specific Integrated Circuit (ASIC), Complex Programmable Logic Device (CPLD), or the like.

Figure 3:
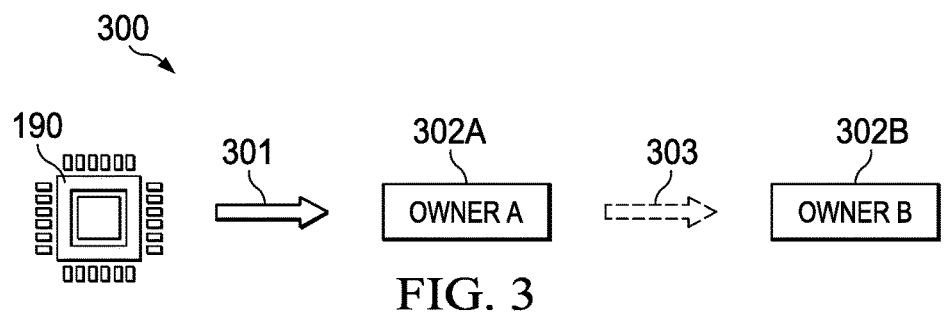
FIG. 3 is a diagram of an example of a unidirectional chain of control of a security processor, chip, or IHS, according to some embodiments.

FIG. 3 is a diagram of an example of a unidirectional chain of control 300 of security processor 190, chip 200, and/or IHS 100, according to some embodiments. In chain 300, security processor 190 may be manufactured and customized by a chip manufacturer and transported, in operation 301, to first owner 302A. Once security processor 190 reaches first owner 302A, it stays under control of that entity until first owner 302A transfers security processor 190 to second owner 302B in transaction 303. As part of transaction 303 first owner 302A revokes its ability to control security processor 190 in favor of second owner 302B, including the ability to execute code stored therein, so that only one entity at a time, typically the entity with possession of security processor 190, has control over its firmware, encryptions keys, certificates, etc.

In some cases, first owner 302A may be an Original Equipment Manufacturer (OEM) or IHS manufacturer. In some cases, first owner 302A may be a manufacturer of a printed circuit board assembly (PCBA) or motherboard of the IHS, where the manufacturer has purchased a security chip and installed it on the PCBA. Second owner 302B may be a customer of the OEM entity, or a business, brand or technical group within the OEM entity. In some scenarios, first owner 302A may manufacture and provision an IHS specifically for second owner 302B according to provided specifications.

Here it should be noted that unidirectional chain of control 300 presents several challenges to the OEM's supply chain, such as when first owner 302A is committed to accepting product returns (e.g., followed by repurposing of IHS 100), warranty claims, and/or service calls from second owner 302B. Specifically, in chain of control 300, first owner 302A must rely upon second owner 302B putting first owner 302A back in control of security processor 190 prior to physically shipping IHS 100 to owner 302A, which may not always happen.

Figure 4:
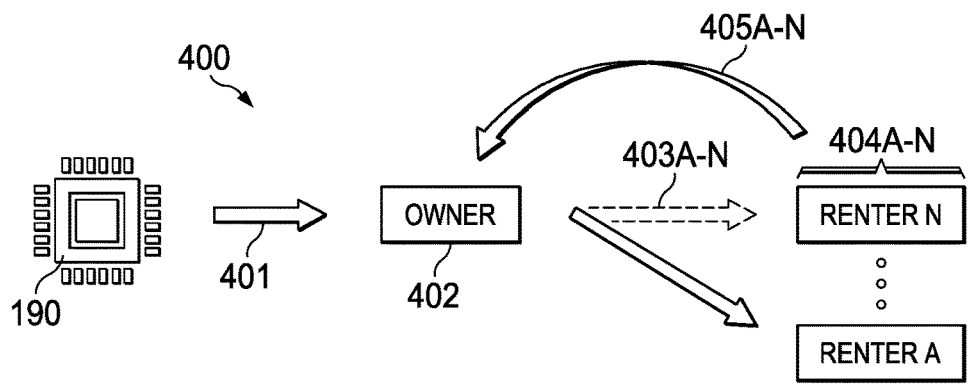
FIG. 4 is a diagram of an example of a bidirectional chain of control of a security processor, chip, or IHS, according to some embodiments.

In contrast with unidirectional chain of control 300, FIG. 4 is a diagram of an example of bidirectional chain of control 400 of security processor 190, chip 200, or IHS 100, according to some embodiments. Particularly, security processor 190 may be customized by a chip manufacturer and transported in operation 401 to owner 402 (e.g., an OEM). Once security processor 190 reaches owner 402, it stays under control of owner 402 until it transfers security processor 190 to renter 404A (e.g., a customer or brand of the OEM) in connection with transaction 403A (e.g., a sale, license, lease, assignment, etc.).

After transaction 403A, however, owner 402 may continue to maintain some restricted form of access to security processor 190, in a manner that reduces or minimizes the potential exposure to renters 404A-N, for example, in the event that owner 402's keys leak while security processor 190 is in the possession of renters 404A-N. As such, when renter 404A returns security processor 190 to owner 402, even in cases where renter 404A does not put owner 402 back in control of security processor 190 prior to shipping IHS 100 to owner 402 in transaction 405A, owner 402 may still exercise some restricted form of control over security processor 190 (e.g., with access to fuse controller but without access to USB, storage, network controllers, etc.) sufficient to evict previous renter 404A's code and to install new renter 404B (e.g., another customer of the OEM entity, etc.) firmware in security processor 190 prior to shipping IHS 100 in transaction 403B.

Figure 5:
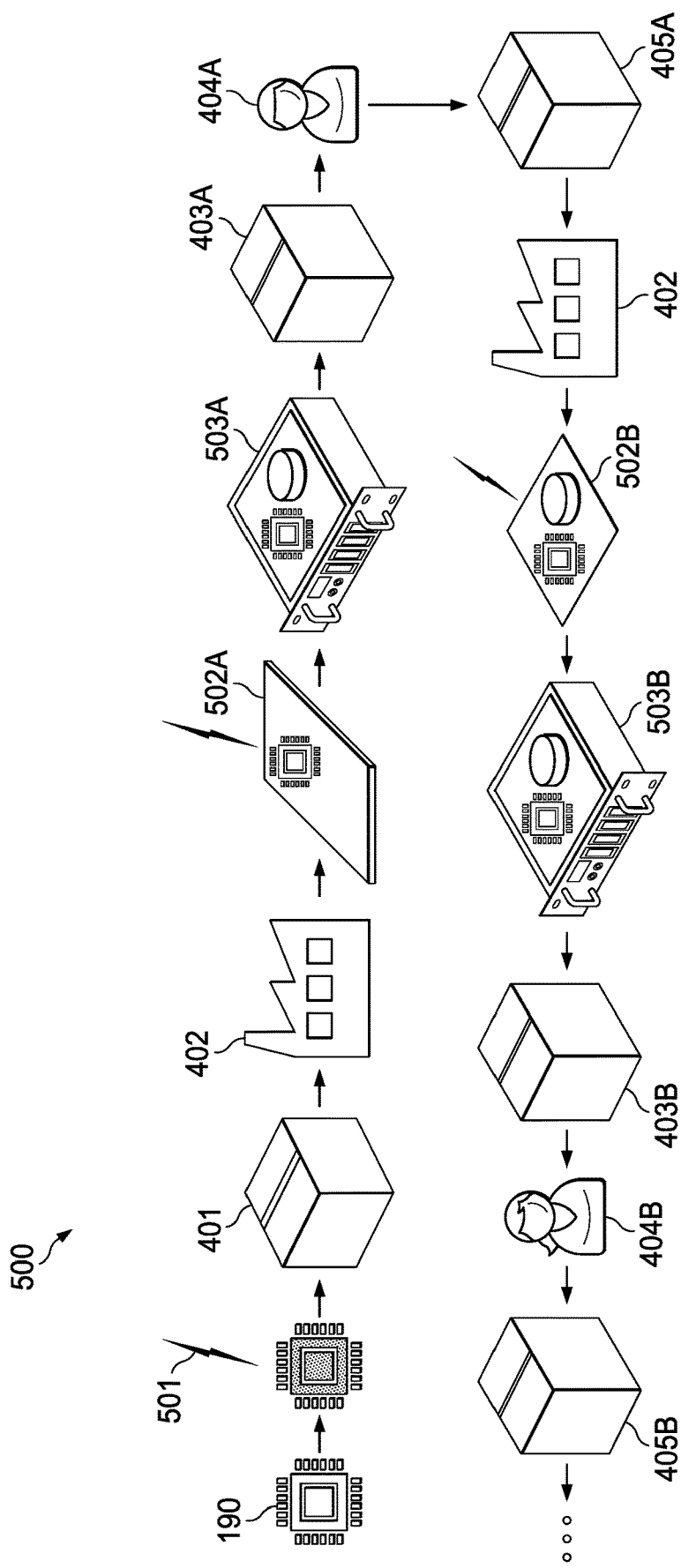
FIG. 5 is a diagram of examples of various supply chain operations involved in the lifecycle of a security processor, chip, or IHS, according to some embodiments.

FIG. 5 is a diagram illustrating examples of various supply chain operations 500 involved in the management of control of security processor 190, chip 200, and/or IHS 100, according to some embodiments. Specifically, security processor 190 may be provisioned 501 for owner 402 (e.g., OEM entity, or manufacturer of IHS 100) by a chip manufacturer and shipped 401 to owner 402. In 502A, owner 402 uses its restricted control over security processor 190 (e.g., where access is excluded from USB, network, and storage controllers) to fuse one or more keys or the like therein, and/or to store code therein that belongs to renter 404A.

In 503A, IHS 100 is assembled, provisioned and tested by owner 402, and then shipped 403A to renter 404A. As described with regard to the below embodiments, factory provisioning of the IHS 100 may include operations by a security processor of the IHS that generate cryptographic certificates that validate the identity of the motherboard installed in the IHS 100 and that also validate the chassis from which the IHS 100 was assembled. Once the owner 402 transfers possession of the IHS 100 to renter 404A, boot code instructions, that may be provided by the renter, are used to validate the authenticity of the motherboard and chassis as being the same motherboard and chassis from which the IHS 100 was manufactured and delivered to the renter 404A. Also as described below, embodiments provide capabilities by which the renter 404A may inject a key or other credentials to the security processor 190 in a secure manner. Once the renter 404A has injected its own credentials to the security processor 190, the renter 404A may utilize its own boot code and its own security validations to establish its own root of trust in IHS 100, without reliance on owner 402. In some embodiments, the root of trust established by a renter may be used in validating the authenticity of replaceable hardware components of the IHS that may be coupled to the IHS by the owner or by the renter.

In some scenarios, renter 404A returns 405A IHS 100 to owner 402, for example, in connection with a return, warranty claim, or service request. In 502B, owner 402 evicts renter 404A from security processor 190, for example, by incrementing the value(s) one of one or more irreversible pointers or counters within security processor 190, where these counters specify the boot code and encryption keys that will be used by security processor, thus providing a subsequent renter 404B with exclusive control over security processor 190. This process is described in additional detail in co-pending application Ser. No. 17/372,619 that is incorporated by reference herein in its entirety. In 503B, IHS 100 is updated, re-assembled, provisioned and tested by owner 402. In provisioning IHS 100, owner 402 may use its restricted control over security processor 190 to fuse one or more keys or the like and/or to store code therein that belongs to another renter 404B. IHS 100 is shipped 403B to renter 404B, who may also eventually return 405B IHS 100 to owner 402, and so on.

Figure 6:
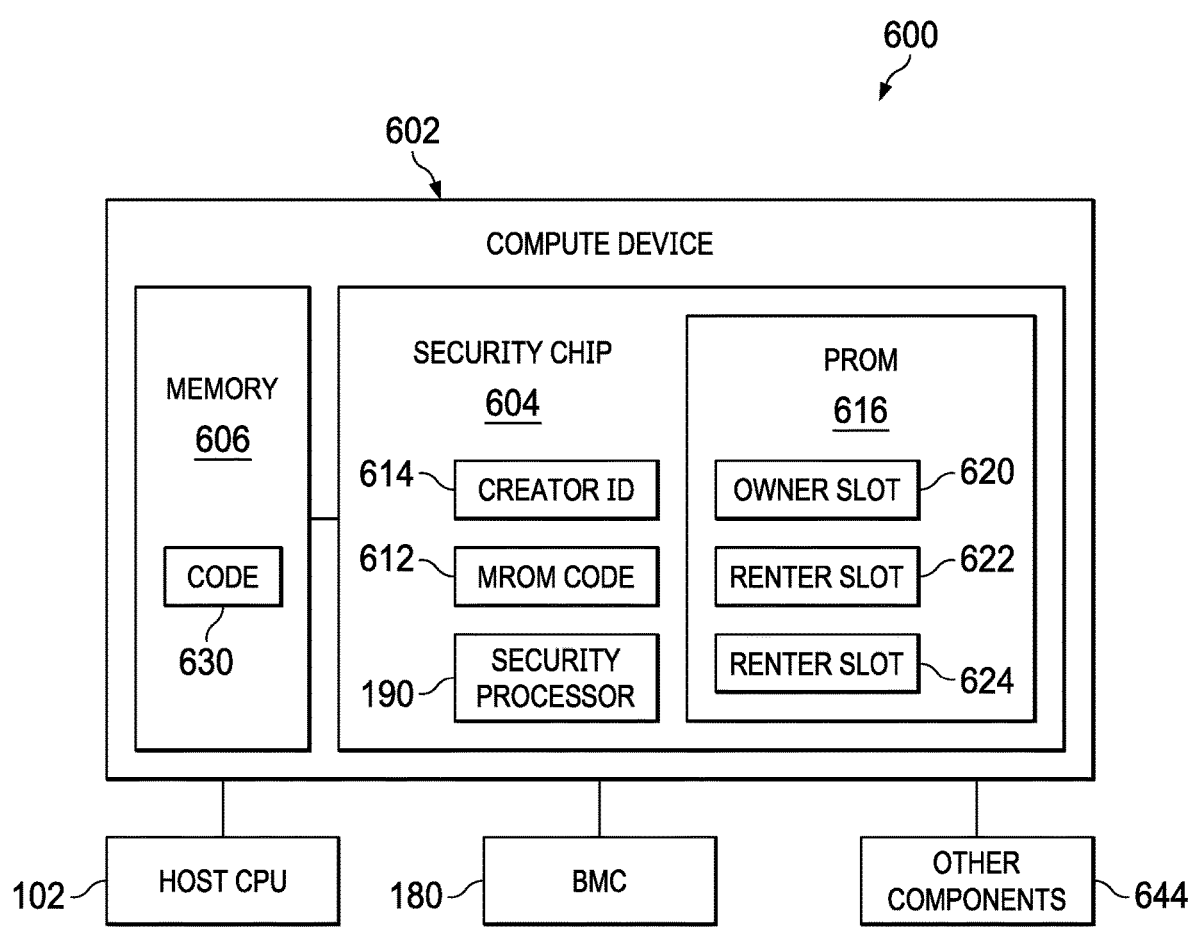
FIG. 6 is a diagram of an example of a compute device, according to some embodiments.

FIG. 6 is a diagram of an example of a portion of compute device 602 of IHS 600, according to some embodiments. IHS 600 may be any suitable system, such as IHS 100 of FIG. 1. Compute device 602 includes security chip 604 (e.g., chip 200) and memory 606. In an example, security chip 604 may be a System-on-a-Chip (SoC). In other examples, however, security chip 604 may be any suitable security chip with a processor or controller 190 and customizable instructions including. As illustrated, security chip 604 may include a security processor 190, Mask Read-Only Memory (MROM) code 612, security chip ID 614, and Programmable Read-Only Memory (PROM) 614. In an example, PROM 616 includes one-time programmable memory locations or slots to store any suitable data associated with security chip 604, such as the identity keys and certificates described in additional detail below. Memory 606 may be any suitable type of flash memory including, but not limited to, an electronically erasable programmable read-only memory. Memory 606 may be utilized to store one or more sets of code 630 that may be retrieved and executed by security processor 190, where this code may include owner boot code or renter boot code. Code 630 may be stored in any suitable location including, but not limited to, memory 606. Code 630 may be written in memory 606 in any suitable manner including, but not limited to, through the use of add-on chip that interfaces with security chip 604 that writes code 630 into the memory 606.

Other components 644 may include any suitable components of compute device 602 including, but not limited to, a Graphics Processing Unit (GPU), a host bus adaptor, a cryptography offload device, a power supply unit, and a network interface card. In some embodiments of the systems and methods described herein, compute device 602, via security chip 604, may perform any suitable operation including, but not limited to, the operations disclosed herein. In other embodiments, compute device 602 may include additional components without varying from the scope of this disclosure.

As described, a chip manufacturer or silicon creator may manufacture security chip 604 in a variety of manners, such as an SoC. During the manufacture of security chip 604, the chip manufacturer may program, write, burn, or otherwise permanently store data within the silicon of the PROM 616 of the security chip. Also during manufacture of security chip 604, MROM code 612 may be programmed with hardwired instructions and data, such that the MROM contents cannot be changed any further after this programming by the manufacturer of the security chip. In some instances, the security chip manufacturer may also store or burn a unique security chip identification (ID) 614 within the silicon of each security chip 604. As described in additional detail below, in some embodiments, this security chip ID 614 may be utilized by a renter receiving control of an IHS, and consequently of the security chip 604, to validate the authenticity of the security chip 604 as the same chip that was installed in the IHS during its manufacture.

In some embodiments, the security chip or IHS manufacturer may store an owner ID within owner slot 620 of the PROM 616 of the security chip 604. In an example, the owner ID stored within owner slot 620 during manufacture and provisioning may be a public key for use in authenticating boot code 630 stored within memory 606 of the IHS. Additional data may be stored within owner slot 620 including a hidden root key (HRK), boot keys and identity keys.

HRK may be a symmetric key utilized for local encryption and decryption by security chip 604. Secure boot keys may be utilized by the security processor to sign code and/or certificates. As described in additional detail below, identity keys may be utilized to support proof-of-identity challenges for establishing the authenticity of the IHS, components from which the IHS has been manufactured and replaceable components that are coupled to the IHS. Embodiments may also support use of identity keys stored in the owner lot and/or in a renter slot to establish the identity of the IHS as being configured for key injection by a renter that will operate the IHS.

The term "secure boot," as used herein, refers to capabilities developed to assure that an IHS boots using only trusted software. "Booting" refers to a chain of events that starts with execution of hardware-based procedures and then hands-off to firmware and software loaded into a memory, and it may involve processes such as one or more of: self-tests, the loading of configuration settings, and/or the loading of one or more of a BIOS, a hypervisor, an OS, or the like.

In various supported secure boot modes, once IHS 100 is initialized, security processor 190 validates signatures for boot code that is loaded and utilized and thus iteratively expands a root of trust by validating signatures of additional instructions that are loaded, including UEFI firmware drivers (also known as Option ROMs), EFI applications, and procedures for booting an OS. As described in additional detail below, embodiments may support boot code procedures that validate the authenticity of the chassis and/or motherboard of the IHS as being the same chassis and/or motherboard that was installed during manufacture of the IHS. If the motherboard and chassis are determined to be authentic and software signatures for the boot code are validated, IHS 100 boots, and security processor 190 gives control of the IHS to the entity (e.g., owner or renter) in control of the IHS, where the provided amount of control is commensurate with the type of secure boot authorized for the entity (e.g., based on the type of controlling entity, owner 402 or renter 404A-N). The procedures for determining whether control of the IHS is to be granted to an owner or renter, and for loading the appropriate boot code for the entity controlling the IHS are described in co-pending application Ser. No. 17/372,619 that is incorporated by reference herein in its entirety. In scenarios where the controlling entity, such as an OEM, is an owner, the boot code may load instructions for further provisioning of the IHS, such as loading and validating additional firmware 630 and creating additional secure boot keys that are stored in security processor 190. Security chip 604 may utilize keys stored in owner slot 620 of a PROM 616 to authenticate code 630 that is associated with the owner entity. Upon code 630 being authenticated using keys from owner slot 620, the owner entity may execute the code 630 to perform operations including, but not limited to, verifying other devices in IHS 600 that are directly attached to security chip 604 including, but not limited to, host CPU 102, BMC 180, and other components 244. Additional owner boot code executed by security processor 190 may further provision the IHS for delivery to a renter, such as the provisioning of the IHS to support injectable keys by the renter and for provisioning the IHS for validation of replaceable hardware components that may be coupled to the IHS.

In some existing scenarios, an IHS may be manufactured and provisioned by an owner specifically for a particular renter. Upon delivery of these existing IHSs, the renter is able to install software and hardware of their choosing on the IHS, but the renter must rely on software provided by the owner to establish and maintain a root of trust on the IHS. This compromises any ability for end users/customers to have total control of the IHS, since the renter relies on firmware, identity information, and encryption keys provided by the owner. Embodiments of the co-pending applications specified above provide capabilities by which exclusive control of an IHS may be granted to successive renters of the IHS without compromising the supply-chain security of the IHS manufacturer. Depending on the entity controlling the IHS, boot code for the controlling entity is identified and encryption keys for the controlling entity are retrieved from the appropriate owner or renter slot 620, 622, 624 of the PROM 616 of the security chip. When the IHS is in possession of an owner, code 630 that can be accessed using keys stored in owner slot 620 may be used to create and remove renters by programming and invalidating renter slots 622, 624 within PROM 616. When the IHS is in possession of a renter, code 630 that can be accessed using keys stored in the slot 622, 624 corresponding to the renter may be used by the security processor 190 to establish a root of trust using boot code and other instructions provided by the renter, thus allowing renters to independently establish their own root of trust in the IHS. As described below, capabilities for a renter to establish their own root of trust in the IHS are supported by embodiments that allow the renter to import their own cryptographic keys or other credentials to the IHS, thus allowing the renter to utilize the security processor 190 to enforce security protocols while utilizing credentials that have been provided by the renter. Utilizing these capabilities to establish an independent root of trust using their own imported security credentials, embodiments further support renters validating replaceable hardware components that may have been provisioned at the factory, or may be provisioned by the renter.

These capabilities for exclusive use of owner or renter boot code may be utilized by embodiments described herein to provide renters with the ability to validate that an IHS includes the same motherboard and chassis from which the IHS was manufactured and provisioned by the owner, and to validate the authenticity of replaceable hardware components coupled to the IHS. As described in additional detail below, during factory provisioning of an IHS, keys in owner slot 620 may be used to access owner boot code that is used to obtain digital certificates that establish the identities of the motherboard and chassis installed during manufacture of the IHS. Such owner boot code may be further used to obtain a digital certificate that establishes the identity of the IHS as having been factory provisioned to support key injection by a renter. Once the IHS has been delivered to the renter, the keys in renter slots 622 or 624 may be used to access renter boot code that utilizes these digital certificates in validating the authenticity of the detected motherboard and chassis of the IHS, thus providing the renter with assurances that these components of the IHS are genuine and provide a suitable platform for establishing their own root of trust in the IHS. In some embodiment, this root of trust may be utilized by renters to securely authenticate the replaceable components that are coupled to the IHS.

Figure 7A:
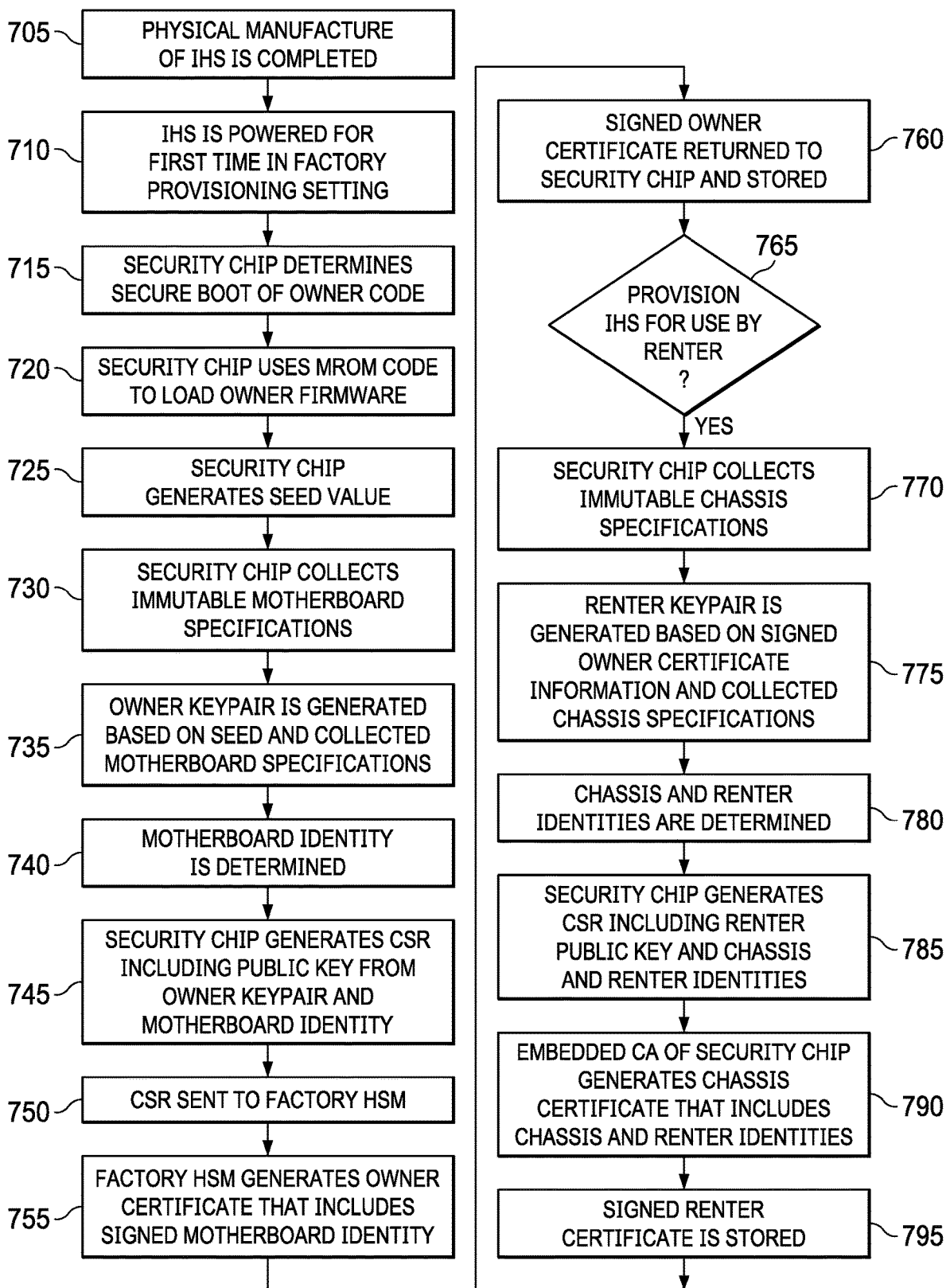
FIG. 7A is a flowchart of an example, according to some embodiments, of a method for manufacturer provisioning of an IHS in a manner that supports validation of the authenticity of the IHS and its components.

FIG. 7A is a flowchart of an example, according to some embodiments, of a method for manufacturer provisioning of an IHS in a manner that supports validation of the identity of the IHS and its components. Embodiments may begin, at 705, with the completion of the physical manufacture of an IHS, such as described above. In particular, an IHS may be manufactured such that it includes a security chip, such as described with regard to FIGS. 2 and 6, that includes a security processor that is configurable to execute boot code for an owner of the IHS or for successive renters of the IHS. In addition, the IHS may be manufactured to include one or more replaceable hardware components. In some cases, these replaceable hardware components, such as those described with regard to the IHS of FIG. 1, may be selected, configured and installed based on specifications of a particular renter that has contracted for manufacture of the IHS.

The manufacture of an IHS may be completed at one or more facilities and may involve various stages. In some instances, an IHS may be assembled according to specifications provided by a renter that has contracted for manufacture and delivery of an IHS. In other instances, an IHS may be assembled according to a base specification that, in some cases, may then adapted for the needs of a particular renter. For example, in embodiments where an IHS is a rack-mounted server, a motherboard of the IHS may be assembled or purchased according to a base specification. This standard motherboard may then be installed within a server chassis that is customized with various components requested by a specific customer, such as storage controllers, storage drives, network cards, etc. The physical manufacture of an IHS may be completed at a single facility, or may include manufacturing steps conducted at several different facilities.

Once the physical manufacture of an IHS is completed such that all permanent hardware components have been fixed to the IHS, at 710, the IHS may be powered for the very first time in a factory provisioning setting. In some instances, this factory provisioning setting may be a facility that is co-located with the factory at which the IHS was manufactured. In other instances, this factory provisioning setting may be a separate facility that is operated by the manufacturer of the IHS, or by an entity that has been contracted to provide provisioning services by the manufacturer of the IHS. In all instances, the factory provisioning setting may be a secure facility that implements procedures that eliminate any opportunities for a malicious actor to gain access to an IHS, whether physical access or remote access, while the IHS is being provisioned.

When initially powered at a factory provisioning setting, at 720, the initial boot code that is executed serves to initialize a security chip of the IHS according to instructions provided by the owner of the IHS, such as instructions encoded within an MROM that is accessible by a security processor of the security chip. As described above, embodiments may support capabilities for the security processor to execute boot code instructions provided by the owner of an IHS, or to instead execute boot code provided by a renter of the IHS, where the operation of these different sets of boot code instructions may be mutually exclusive, thus providing both the owner and renter of the IHS with separate assurances that the IHS is being booted and initialized using only instructions provided by the owner or by a specific renter. In some embodiments, the initial boot code instructions used to determine whether to load either owner boot code or boot code provided by a renter may be programmed during manufacture of the IHS within an MROM that is permanently fixed to a motherboard or security chip of the IHS. In the embodiment of FIG. 7A, this initial boot code in the MROM determines, at 720, that owner boot code will be loaded and used in the initial operation and provisioning of the IHS.

According to owner boot instructions that are retrieved from the MROM, the security processor may retrieve and validate firmware instructions for use by the security processor against a reference signature for these firmware instructions, where the reference signature may have been permanently encoded within the PROM of the security chip, or within another memory, during manufacture of the IHS. If the retrieved firmware is successfully validated, it may be loaded and executed by the security processor, such that the security processor is assured to be using authentic instructions and also serving to establish an initial root of trust in the security processor. At 725, retrieved owner boot code may be executed by the security processor in generating one or more encryption secrets, such as random seed values, that may utilized in the generation of the identity key pairs described herein.

Using retrieved owner code, at 730, the security processor collects specifications that uniquely identify the motherboard of the IHS, where the collected specifications are immutable and unique characteristics of the motherboard. In some embodiments, the security processor may retrieve a unique value this is encoded by each of the system processors that are coupled to the motherboard of the IHS. In such instances, the owner code executed by the security processor may include instructions for retrieving a unique and immutable identifier from the main processor, where this identifier of the processor is only accessible during pre-boot operations and is not otherwise made available by the processor. In the same manner, the security chip may use owner code to retrieve unique and immutable identifiers used by memory devices that are permanently fixed to the motherboard, such as a unique identifier of a SPI flash memory device that is soldered to the motherboard and is used to store boot code. In some embodiments, the security processor may use owner boot code to collect other immutable characteristics of a motherboard, such as a data structure that is populated with indications specifying whether motherboard components are detected as being coupled to specific GPIO pins supported by the motherboard.

After the immutable specifications of the motherboard have been collected, at 735, the security processor generates a cryptographic key pair for use by the owner and renters of the IHS in validating the identity of the motherboard. As described above, a security processor according to embodiments may support various cryptographic capabilities that may be enabled through the use of owner boot code, such as key pair generation. In these embodiments, the security processor may utilize the previously generated seed value and the immutable specifications of the motherboard as unique values from which a key pair is generated. Once the key pair is generated, the security processor may permanently store the private key of this key pair, along with other keys, within slots of a PROM of the security chip, such as described above.

In the illustrated embodiment, provisioning of the IHS continues, at 740, with the security processor determining the identity of the motherboard installed in the IHS. Whereas the previously described immutable specifications of the motherboard are unique characteristics that are not accessible by post-boot software applications, such as operating system programs or programs operating on other components of the IHS, the identity of the motherboard is an externally verifiable identifier of this motherboard, where such motherboard identity values may or may not be unique values. In some embodiments, the motherboard identity may be a part number assigned by the manufacturer of the motherboard, or by the manufacturer of the IHS. In some embodiments, the motherboard identity may additionally or alternatively be an identifier specifying the facility at which the motherboard with manufactured. Other embodiments may utilize various other sources of information that may be used to identify the motherboard.

As indicated at 745, the security processor generates a CSR (certificate signing request) that requests a digital certificate, where this certificate will be usable to validate the identity of the motherboard once the IHS has been put into operation, such as by a renter. The security processor includes the public key of the generated owner keypair in the CSR, thus requesting a digital certificate to be issued for use of this public key of the owner keypair. The security processor additionally includes the motherboard identity in the CSR, such as the collected part number or other identifier of the motherboard. In some embodiments, in addition to including the motherboard identity in the CSR, the security processor may additionally include identity information for the security processor itself in the CSR. In some embodiments, the identity information included in the CSR may further include an identity, such as a part number, of the main processor(s) of the IHS.

At 750, the CSR generated by the security processor may be submitted to a certificate authority (CA) that operates within the factory provisioning setting. In some embodiments, this CA may be a factory HSM (hardware security module) that operates in the factory provisioning setting and manages cryptographic operations and information on behalf of the manufacturer of the IHS. The CA capabilities of the HSM may thus be utilized, at 755, to generate the requested digital certificate. In generating the certificate, in some embodiments, the HSM may validate the public key from the owner keypair by issuing a cryptographic public key verification to the security processor. In response, security chip uses the private key of the owner key pair to establish exclusive use of the public key from the owner key pair in encrypted, public-key communications. In addition to validating the public key from the CSR, the HSM may also generate a digital signature of the motherboard identity information, and any other identity information, that is also included in the CSR. The validated public key from the owner keypair and the digital signature are included in the certificate generated by the HSM. At 760, the generated certificate, referred to herein as an owner certificate, is returned to the security chip, where it is stored according to instructions provided in the owner boot code being run by the security chip. As described in additional detail with regard to FIG. 8A, the stored owner certificate may be retrieved and used to validate the authenticity of the motherboard as being the same motherboard installed during manufacture of the IHS and provisioned as described herein.

As described above, an entity designated as the owner of an IHS may be provided with the ability to assign exclusive use of a security chip to successive renters of the IHS, such that each renter can establish their own root of trust in the hardware of the IHS. Accordingly, the factory provisioning of an IHS may include provisioning of the IHS for use by a renter. During manufacture of the IHS, a motherboard is installed within a chassis of the IHS. As described, the motherboard may be identified through various immutable specifications. In some cases, large quantities of such motherboards may be manufactured identically. Once the motherboard is installed within a chassis, various components may be fixed to the chassis in customizing the IHS for use by a particular renter, or for a particular application, such as customizing a rack-mounted server for data warehouse operations. In some scenarios, additional components may be alternatively or additionally fixed to the motherboard in customizing the IHS for use by a particular renter, or for a particular application. In some scenarios, a particular type or model of chassis may be selected during manufacture for use by a particular renter. As with the validation of the motherboard identity, embodiments support capabilities for validating the identity of these chassis components that have been installed during manufacture of the IHS, in some cases according to specifications provided by a particular renter that has contracted for manufacture of the IHS. Embodiments further support capabilities for validating the authenticity of replaceable hardware components of the IHS that may be coupled to the IHS by the owner or by the renter.

As indicated in FIG. 7A, factory provisioning may continue, at 765, with the determination whether to continue with provisioning the IHS for use by renter, where the identity of the renter may be known or unknown. If provisioning the IHS for a renter, the owner boot code instructions executed by the security chip may continue, at 770, with the collection of immutable chassis specifications. As with the immutable specifications of the motherboard described above, the security chip may collect immutable and preferably nonpublic unique identifiers from the chassis of the IHS. In some embodiments, unique identifiers for the chassis may be provided through queries to a SPI flash memory that is permanently fixed to the chassis. Other embodiments may obtain unique identifiers for the chassis from a chassis management controller, or from a specialized backplane that has been installed in the chassis of a rack-mounted server. Other embodiments may obtain unique identifiers for the chassis based on queries to verify the installation of components to selected GPIO pins supported by the chassis management controller and/or by a backplane.

Embodiments may continue, at 775, with the cryptographic capabilities of the security processor being utilized to generate an additional key pair, referred to herein as a renter key pair. In some embodiments, the renter key pair may be generated based on the immutable unique identifiers of the chassis that are collected by the security chip. In some embodiments, the generation of the renter key pair may also be based on information included in the owner certificate, such as the digital signature. As with the owner key pair, the private key of the renter key pair may be stored to a one-time programmable memory, PROM, of the security chip.

In some embodiments, the renter provisioning may continue, at 780, with the security processor, still utilizing retrieved owner boot code, collecting information specifying the identity of the chassis. In some embodiments, the chassis identifier may be a part number that may be obtained from a persistent memory device supported by the chassis, or by a chassis management controller that has been installed to the IHS, or by a backplane installed in the chassis. As with the identifiers of the motherboard that were included in the owner certificate, the identifiers collected for the chassis are externally verifiable identifiers.

Embodiments may continue, at 785, with the security chip generating a CSR that requests an additional digital certificate, where this certificate will be usable to validate the identity of the chassis once the IHS has been put into operation by a renter. The security processor includes the public key of the generated renter keypair in the CSR, thus requesting a digital certificate that is issued for validated use of this public key of the renter keypair. The security processor additionally includes the chassis identity in the CSR, such as the collected part number of the chassis, and such as other chassis identifiers of a chassis management controller and/or of a backplane.

Whereas the CSR for the owner certificate is submitted to the factory provisioning HSM, the CSR for establishing the chassis identity is signed by the cryptographic capabilities of the security processor. As described above, the security processor may include capabilities that allow the processor to operate as an embedded certificate authority (CA) capable of generating, signing and issuing digital certificates. Accordingly, at 790, the embedded CA of the security chip generates a digital certificate, referred to herein as a renter certificate, that validates the authenticity of the public key of the renter key pair and that also includes a digital signature of the identity information for the chassis that is to be included in the body of the certificate. Whereas the owner certificate is signed using a private key of the factory CA, the renter certificate is signed using the private key of the owner key pair. As described in additional detail below, when signed in this manner, the validity of the renter certificate may be confirmed by the security processor, through operations by the embedded CA, once the IHS is provisioned and deployed by a renter. In some embodiments, the renter certificate may be additionally or alternatively signed by the factory CA. At 795, the generated renter certificate is stored according to owner boot code instructions executed by the security processor. With the generation of the renter certificate completed, embodiments may continue in FIG. 7B with additional factory provisioning of the IHS for key injection by the renter that will be receiving the IHS, thus allowing the renter to utilize the injected keys to establish their own independent root of trust while using the validated motherboard and chassis, and to validate replaceable hardware components that have been coupled to the IHS by the owner or by the renter.

Figure 7B:
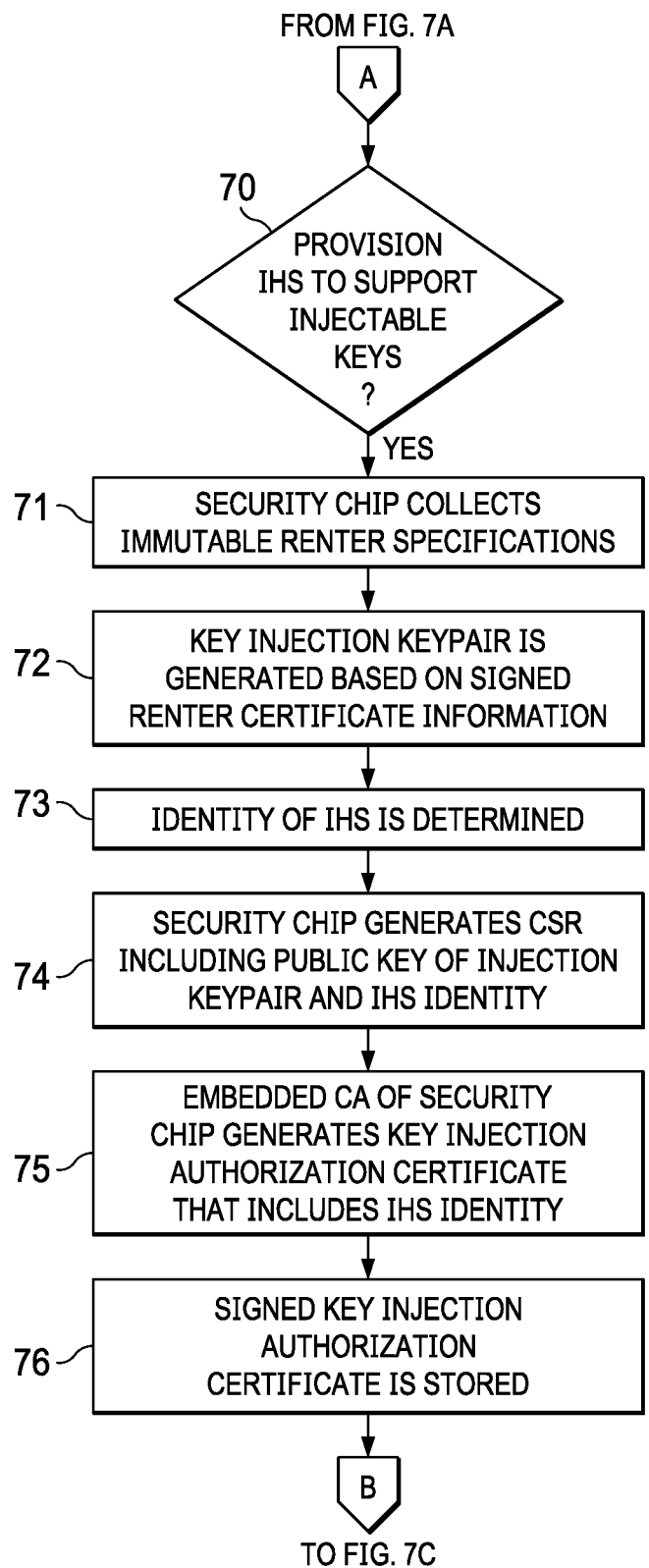
FIG. 7B is a flowchart of an example, according to some embodiments, of a method for manufacturer provisioning of an IHS in a manner that supports secure key injection by a renter of the IHS.

FIG. 7B is a flowchart of an example, according to some embodiments, of a method for manufacturer provisioning of an IHS in a manner that supports secure key injection by a renter of the IHS. Embodiments may continue, at 70, with the operation of the owner boot code determining whether to provision the IHS to support injection of keys by a renter that will receive and operate the IHS. If provisioning the IHS for injection of keys by a renter, the owner boot code instructions executed by the security processor may continue, at 71, with the collection of immutable renter specifications, such as from the renter certificate generated above. Embodiments may continue, at 72, with the cryptographic capabilities of the security processor being utilized to generate an additional key pair, referred to herein as a key injection key pair. In some embodiments, the key injection key pair may be generated based on the immutable renter specifications, such as specifications collected from the renter certificate. As with the above key pairs, the private key of the key injection key pair may be stored to a one-time programmable memory, PROM, of the security chip.

In some embodiments, the key injection provisioning may continue, at 72, with the security processor, still utilizing retrieved owner boot code, collecting information specifying the identity of the IHS that is being provisioned for operation by the renter. In some embodiments, the IHS identity may be a unique identifier assigned to the IHS by its manufacturer, where the unique identifier may correspond to the motherboard and chassis of the IHS, and may also correspond to one or more replaceable components that have been coupled to the IHS, such as components described with regard to FIG. 1. In some embodiments, the IHS identity may be a service tag or other unique identifier for the IHS that is externally verifiable. In some embodiments, the service tag or other identifier may be associated with a particular renter, thus providing the owner and renter with an identifier that may be used in the owner's ongoing support for the IHS once it is in operation by the renter. As with the above identifiers for the motherboard and the chassis, any IHS identifiers are externally verifiable identifiers.

Embodiments may continue, at 74, with the security chip generating a CSR that requests an additional digital certificate, where this certificate will be usable to validate the identity of the IHS as being factory provisioned for key injection by the renter associated with this particular IHS identity. The security processor includes the public key of the generated key injection keypair in the CSR. The security processor additionally includes the IHS identity in the CSR, such as the collected service tag. As with the renter certificate used for validating the chassis identity, the CSR for establishing the IHS identity is signed by the cryptographic capabilities of the security processor. As described, the security processor may include embedded certificate authority (CA) capabilities that support generating, signing and issuing digital certificates. Accordingly, at 75, the embedded CA of the security chip generates a digital certificate, referred to herein as a key injection authorization certificate, that validates the authenticity of the public key of the key injection key pair and that also includes a digital signature of the IHS identity information that is to be included in the body of the certificate. The key injection authorization certificate is signed by the security processor using the private key of the renter key pair.

As described in additional detail below, when signed in this manner, the validity of the key injection authorization certificate may be confirmed by the security processor once the IHS is provisioned and deployed by a renter. At 76, the generated key injection authorization certificate is stored according to owner boot code instructions executed by the security processor. With the generation of the key injection authorization certificate completed, factory provisioning of the IHS may continue in FIG. 7C with the provisioning of the IHS to support validation of replaceable hardware components that have been coupled to the IHS.

Figure 7C:
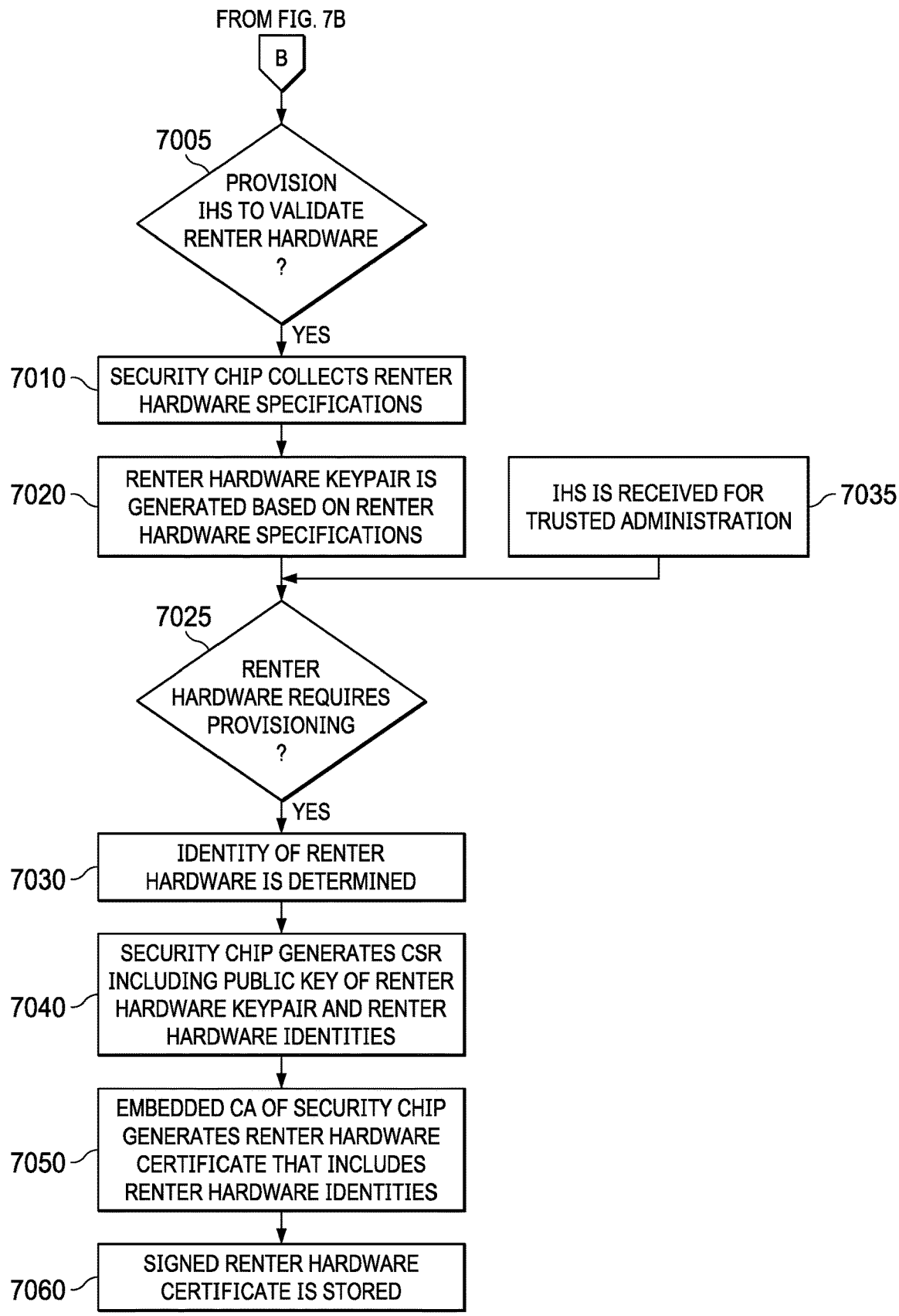
FIG. 7C is a flowchart of an example, according to some embodiments, of a method for manufacturer provisioning of an IHS in a manner that supports validation of the authenticity of replaceable hardware components of the IHS.

FIG. 7C is a flowchart of an example, according to some embodiments, of a method for manufacturer provisioning of an IHS in a manner that supports validation of the authenticity of replaceable hardware components of the IHS. As indicated in FIG. 7C, factory provisioning may continue, at 7005, with the determination whether to continue with provisioning the IHS for validating of replaceable hardware components that have been coupled to the IHS during factory assembly of the IHS. If replaceable hardware has been coupled to the IHS on behalf of the renter for which the IHS is being provisioned, the owner boot code instructions executed by the security chip may continue, at 7010, with the collection of immutable specifications of the replaceable hardware. As with the immutable specifications described above, the security chip may collect immutable and preferably nonpublic unique identifiers from some or all of the replaceable hardware components that are detected as coupled to the IHS.

Embodiments may continue, at 7020, with the cryptographic capabilities of the security processor being utilized to generate an additional key pair, referred to herein as a renter hardware key pair. In some embodiments, the renter hardware key pair may be generated based on the immutable unique identifiers of the replaceable hardware that are collected by the security chip. In some embodiments, the generation of the renter hardware key pair may be additionally or alternatively based on information included in the renter certificate, such as the digital signature. As with the key pairs described above, the private key of the renter hardware key pair may be stored to a one-time programmable memory, PROM, of the security chip.

Figure 8A:
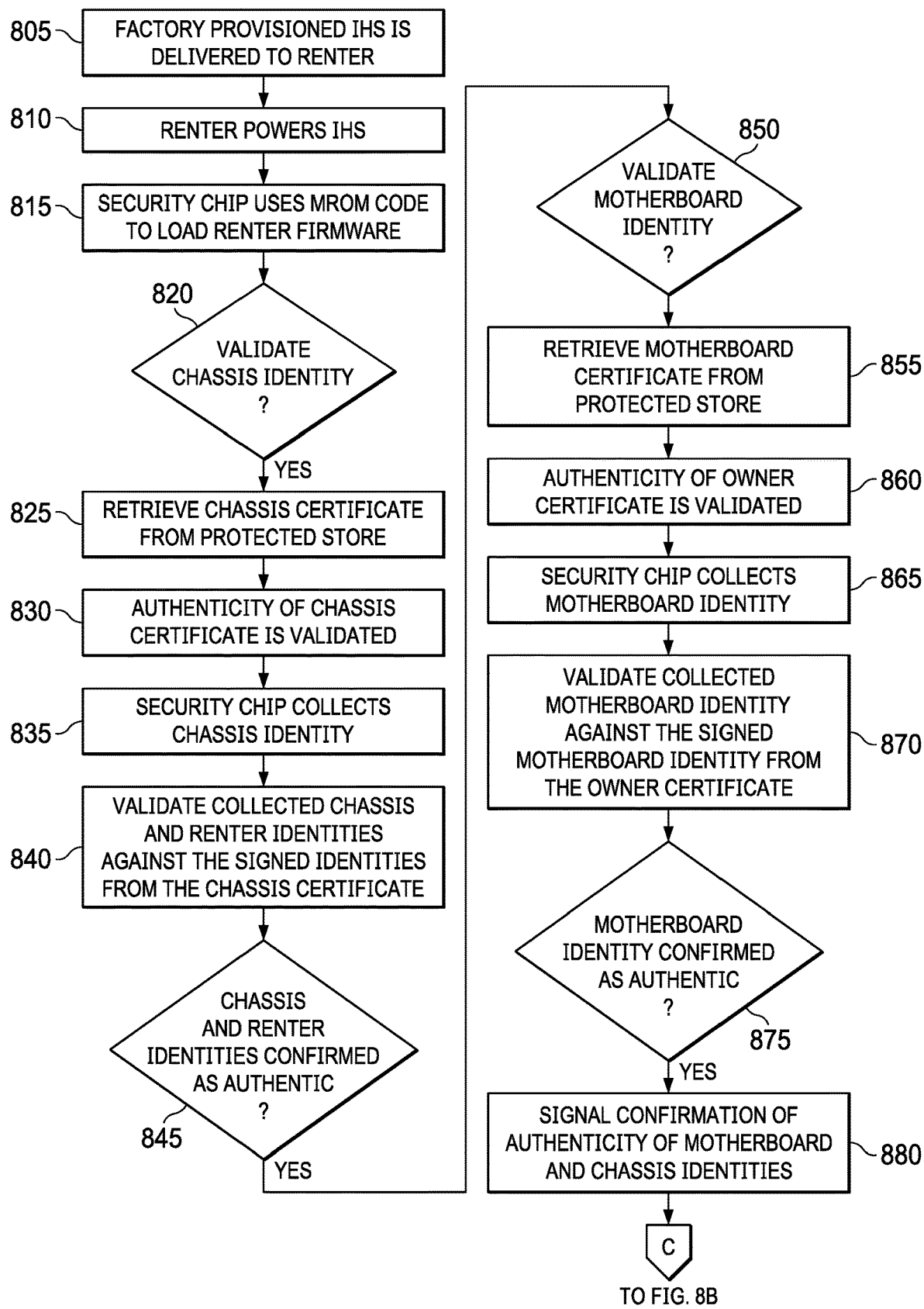
FIG. 8A is a flowchart of an example, according to some embodiments, of a method for validating the authenticity of an IHS and its components.
Figure 8B:
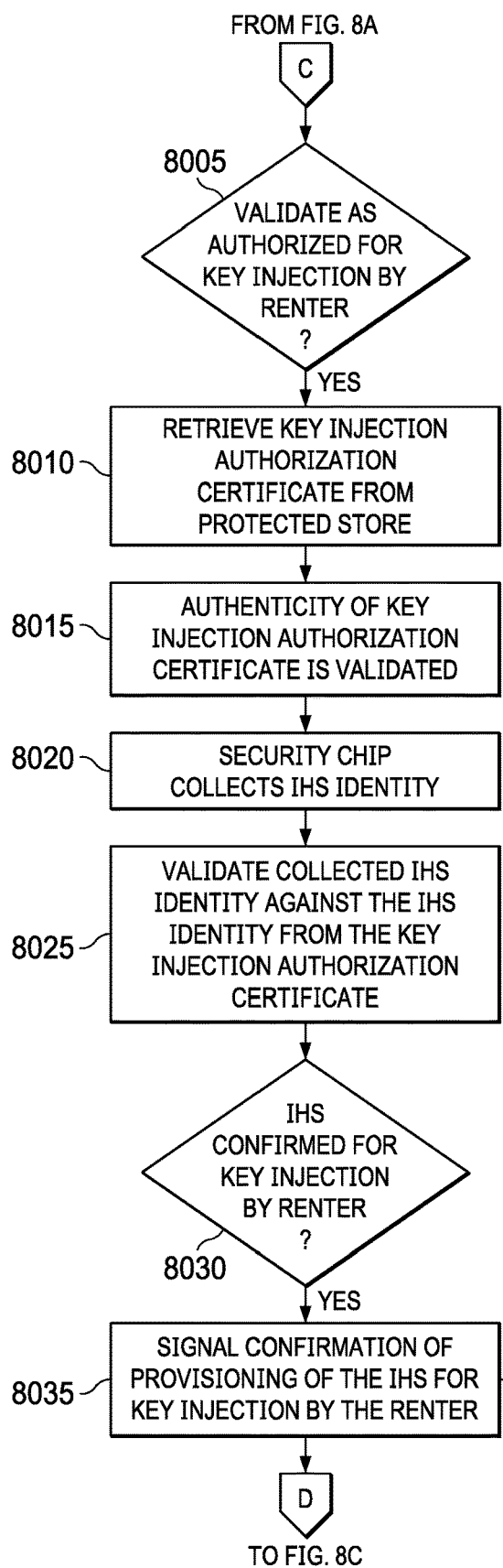
FIG. 8B is a flowchart of an example, according to some embodiments, of a method for validating a customer certificate that authorizes key injection and for validating a renter request for injection of a key.
Figure 8B:
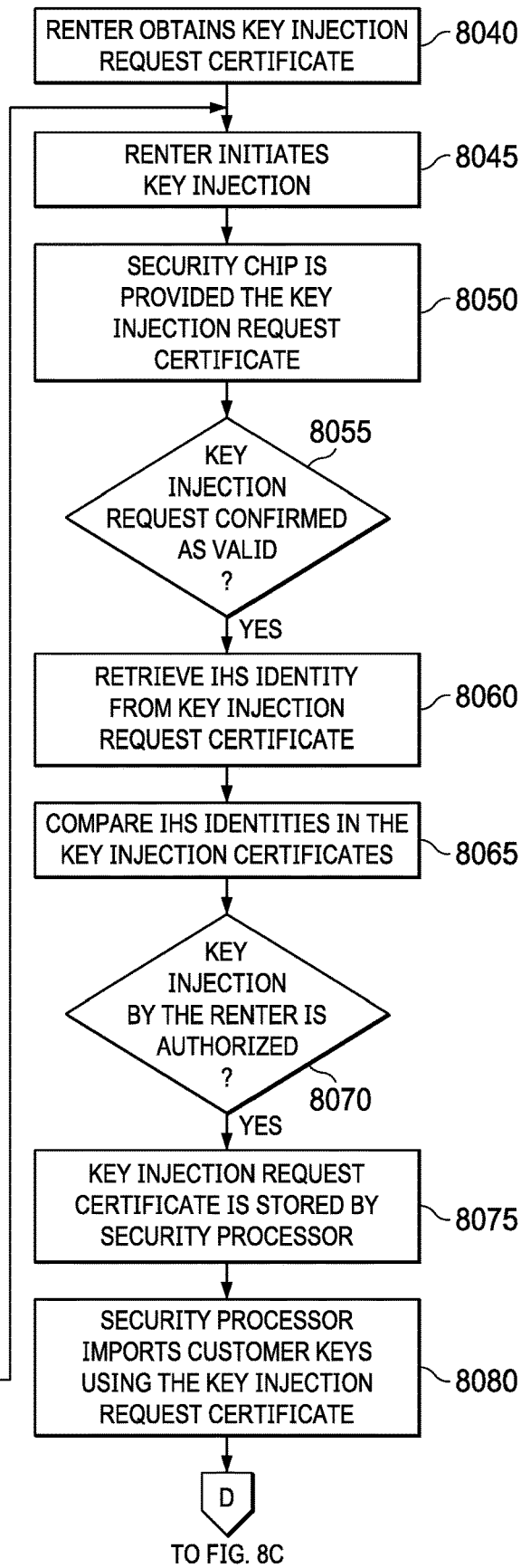
Figure 8C:
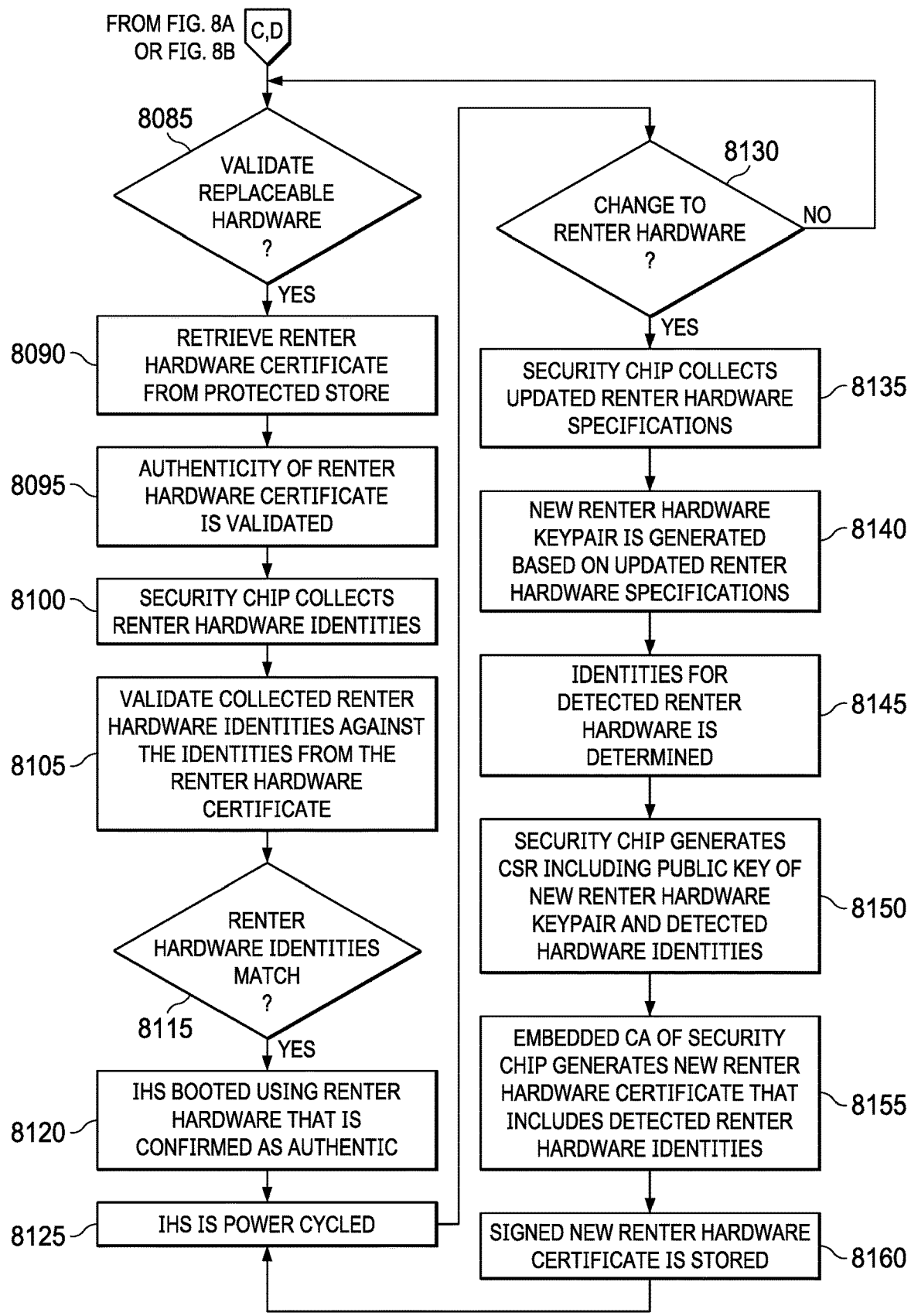
FIG. 8C is a flowchart of an example, according to some embodiments, of a method for validating the authenticity of replaceable hardware components of an IHS.

In scenarios where no replaceable hardware is installed during factory provisioning of the IHS, the security processor may forgo the additional provisioning of FIG. 7C, but the replaceable hardware key pair is nonetheless generated, stored and available for use in validating replaceable hardware once it has been coupled to the IHS by the renter, such as described in additional detail with regard to FIG. 8C. As described, embodiments support factory provisioning of an IHS for use by a renter. Embodiments also support trusted administration of the IHS by the owner, such as in scenarios where a renter returns an IHS to the owner for service, which may include provisioning the IHS for deployment in a new setting. Accordingly, as indicated at 7035, an IHS may be received by the owner for trusted administration, where such administration may include coupling or removing replaceable hardware to the IHS. At 7025, the security processor may determine whether to proceed with additional provisioning of replaceable hardware based on whether replaceable hardware requiring provisioning has been coupled to the IHS during factory provisioning, or whether changes to the replaceable hardware have been made during trusted administration of the IHS.

If replaceable hardware requiring provisioning is detected, the renter provisioning may continue, at 7030, with the security processor, still utilizing retrieved owner boot code, collecting information specifying the identity information for each of the replaceable hardware components that are detected as coupled to the IHS. In some embodiments, the hardware identifiers may be a part numbers or model numbers that may be obtained from persistent memory devices supported by each respective hardware component, or through queries supported by management controller capabilities of a respective hardware component, or through queries supported by other management functions of the IHS, such as supported by the EC of FIG. 1. As with the identifiers of the motherboard and chassis, the identifiers collected for the replaceable hardware are externally verifiable identifiers.

Embodiments may continue, at 7040, with the security chip generating a CSR that requests an additional digital certificate, where this certificate will be usable to validate the identity of the replaceable hardware of the IHS once it has been put into operation by a renter. The security processor includes the public key of the generated renter hardware keypair in the CSR, thus requesting a digital certificate that is issued for validated use of this public key of the renter hardware keypair. The security processor additionally includes the replaceable hardware identities in the CSR, such as the collected part numbers or model numbers for each of the replaceable hardware components.

As described, the security processor may include capabilities that allow the processor to operate as an embedded certificate authority (CA) capable of generating, signing and issuing digital certificates. Accordingly, at 7050, the embedded CA of the security chip generates a digital certificate, referred to herein as a renter hardware certificate, that validates the authenticity of the public key of the renter hardware key pair and that also includes a digital signature of the identity information for the replaceable hardware that is to be included in the body of the certificate. The renter hardware certificate is signed using the private key of the renter key pair. As described in additional detail below, when signed in this manner, the validity of the renter hardware certificate and the replaceable hardware identities specified therein may be confirmed by the security processor once the IHS is provisioned and deployed by a renter. At 7060, the generated renter hardware certificate is stored according to owner boot code instructions executed by the security processor. With the generation of the renter hardware certificate completed, factory provisioning of the IHS may continue with the installation of an operating system and various software applications on the IHS.

FIG. 8A is a flowchart of an example, according to some embodiments, of a method for validating the authenticity of an IHS and its components. Once the factory provisioning of the IHS is completed, embodiments may continue at 805, with the delivery of the IHS to a renter that will operate the IHS. At 810, the IHS is powered by the renter. In some embodiments, the procedures of FIG. 8A may be implemented each time the IHS is powered. As described, an IHS according to embodiments supports the operation of mutually exclusive boot code that allows the owner of an IHS and successive renters of the IHS to each establish their own root of trust in the hardware of the IHS. Accordingly, in preparation for a transfer of control of an IHS from the owner to a renter, the owner may configure security processor to load boot code provided by the renter upon its next initialization, thus preventing the execution of owner boot code until the renter has been evicted such that control of the IHS has been transferred back to the owner and owner boot code is executed.

In the illustrated embodiment, at 815, the MROM instructions invoked by the security processor upon its initialization determine that control of the IHS has been transferred to a renter. In such scenarios, the security processor may then utilize MROM code to retrieve firmware instructions provided by the renter. As with the firmware instructions provided by the owner, the renter firmware instructions may be validated and subsequently loaded for execution by the security processor. Once these instructions are validated, the renter firmware instructions may be loaded used to validate the authenticity of the motherboard and a chassis of the IHS as being the same motherboard and chassis from which the IHS was manufactured. Embodiments may thus continue, at 820, with the determination by the renter boot code to validate the identity of the chassis of the IHS.

The validation of the chassis identity is initiated, at 825, by the security processor retrieving the renter certificate from a protected memory, such as from a renter slot of the PROM 616 of FIG. 6. Using the renter's boot code instructions, at 830, the security processor may verify the authenticity of the retrieved renter certificate. For instance, such validation procedures may include use of the renter public key included in the renter certificate to generate a public key verification that is addressed through the security processor establishing that this public renter key corresponds to a private renter key that has been permanently stored to a one-time programmable memory, such as the PROM 616 of FIG. 6 that may be accessible solely by the security processor during boot code operations.

If the public key in the renter certificate is validated, at block 835, the security chip may continue use of renter boot code to collect the identity information for the chassis of the IHS that is being booted. As described, available chassis identifiers may include a part number associated with the chassis, a part number or other such identifier associated with a backplane or midplane installed in the chassis and/or part number or other identifier associated with the chassis management controller of the IHS. At 840, the collected identity information is validated against the chassis identity provided in the body of the renter certificate. In some embodiments, the security chip may validate the integrity of the chassis identifiers presented in the renter certificate through use of the renter public key included in the certificate to decode the signature included in the renter certificate. If the decoding of the signature produces the chassis identifiers included in the certificate, the chassis identifiers in the certificate are confirmed as authentic.

At 845, the comparison of the collected chassis identifiers against the chassis identifiers included in the renter certificate confirms that the chassis that is being booted is the same chassis from which the IHS was manufactured, such as described above. If any components of the chassis that are identified within the renter certificate do not match the chassis identifiers collected by the security processor, a compromise of the chassis may be indicated. In scenarios where the collected chassis identifiers correspond to the validated chassis identity included in the renter certificate, at 850, the renter boot code may determine whether to continue with validation of the motherboard of the IHS.

In scenarios where the motherboard will be validated, at 855, the security processor retrieves the owner certificate from a protected memory that may have availability limited to pre-boot operations, such as the PROM 616 of FIG. 6. As with the renter certificate, the validity of the owner certificate may be similarly determined based on the digital signature included in the certificate. As described with regard to FIG. 7A, the owner certificate is generated and signed during factory provisioning of the IHS by a certificate authority that is supported by an HSM or other cryptographic support tool operating in the factory provisioning setting. Accordingly, the security processor may validate the authenticity of the owner certificate through a public key verification issued to the certificate authority that signed the certificate. In some embodiments, the certificate authority may operate on behalf of the manufacturer of the IHS, or on behalf of another entity that provides ongoing support for the IHS and that has been designated as an owner, such as described herein, of the IHS. If the security processor establishes that the public key in the owner certificate corresponds to a key pair controlled by the owner of the IHS, the authenticity of the owner certificate is established.

Embodiments may continue, at 865, with the validation of the motherboard identity against the identity information included in the owner certificate. The security processor may utilize the renter boot code in collecting the identity of the motherboard. As described, the motherboard identity may be implemented as a part number, model number, series number or other identifier that has been assigned to the motherboard. Also as described, the motherboard identity may additionally or alternatively be specified based on part numbers or other identifiers associated with the main processor(s) of the IHS and/or associated with the security chip.

Validation of the owner certificate may continue, at 870, with the validation of the motherboard identity information included in the certificate. For instance, the security processor may utilize the owner public key that was used to establish the authenticity of the certificate in order to decode the digital signature included in the certificate. If the decoding results match the motherboard identifiers included in the body of the certificate, the integrity of the motherboard identifiers is confirmed. If the collected motherboard identifiers match the identifiers included in the motherboard certificate, at 875, the motherboard is confirmed as having been installed during manufacture of the IHS and confirmed as configured for operation, according to the embodiments described herein, during factory provisioning of the IHS, such as described with regard to FIG. 7A. Accordingly, at 880, the authenticity of the motherboard and chassis as the components that were installed in the IHS during its manufacture may be confirmed and the security processor may continue use of the renter boot code in the remaining boot procedures described with regard to FIG. 8B that support validation of the IHS as being configured for key injection by the renter.

FIG. 8B is a flowchart of an example, according to some embodiments, of a method for validating a certificate that authorizes key injection by a renter and for validating the renter's request for transfer of credentials to an IHS. In scenarios where the motherboard and chassis identities have been validated, at 8005, the renter boot code may determine whether to continue with validation of the IHS as being factory provisioned for key injection by the renter. In scenarios where the IHS will be validated as supporting key injection, at 8010, the security processor retrieves the key injection authorization certificate from a protected memory, such as the PROM 616 of FIG. 6, that may be limited to access by boot code. As with the owner and renter certificates, the validity of the key injection authorization certificate may be similarly determined based on the digital signature included in the customer certificate.

Using the renter's boot code instructions, at 8015, the security processor may verify the authenticity of the retrieved key injection authorization certificate. For instance, such validation procedures may include use of the key injection public key included in the key injection authorization certificate to generate a challenge that is addressed through the security processor establishing that this public key corresponds to a private injection key that has been permanently stored to a one-time programmable memory, such as the PROM 616 of FIG. 6 during factory provisioning of the IHS.

If the public key in the key injection authorization certificate is validated, at block 8020, the security chip may continue use of renter boot code to collect the identity information for the IHS that is being booted. As described, IHS identifiers may be a service tag or other identifier that provides a unique, externally verifiable identifier for the IHS, and that may also be associated with a particular renter. In some embodiments, the security processor may utilize renter boot code to retrieve a service tag that is linked to the renter from a programmable memory slot 622, 624 of the renter. At 8025, the collected identity information is validated against the IHS identity provided in the body of the key injection authorization certificate. In some embodiments, the security chip may validate the integrity of the IHS identifier presented in the key injection authorization certificate through use of the key injection public key included in the certificate to decode the signature included in the certificate. If the decoding of the signature produces the IHS identifiers included in the certificate, the IHS identifiers in the certificate are confirmed as authentic.

At 8030, the comparison of the collected IHS identifiers against the identifiers included in the key injection authorization certificate confirms that the IHS that is being booted is the same IHS that was provisioned by the manufacturer to support key injection by a renter, and in particular provisioned for key injection by the renter associated with the IHS identifier (e.g., service tag). In such scenarios where the IHS is validated as supporting key injection, at 8045, the renter that has received possession of the IHS may initiate injection of a key or other security credentials to the IHS. As indicated in FIG. 8B, prior to initiating key injection, at 8040, the renter may obtain a key injection request certificate. As described, embodiments support capabilities by which a renter that receives control of an IHS may establish their own root of trust in the IHS, without relying on a root of trust being established by an owner of the IHS. As such, a renter is provided with exclusive control over an IHS in a manner that allows the renter to validate all instructions in use by the IHS according to security protocols that are provided by the renter. In support of renters implementing their own security protocols, embodiment allow validated renters to inject their own cryptographic keypairs or other security credentials to the security processor. In order to utilize this key injection capability, a renter may obtain a public key certificate, referred to herein as a key injection request certificate, that is signed by a certificate authority trusted by the renter. The key injection request certificate may specify the particular IHS for which key injection is to be configured by including the IHS identity, such as a service tag, in the key injection certificate. In such instances, the certificate authority incudes a digital signature of the IHS identity in the key injection authorization certificate.

Upon the renter initiating key injection, at 8050, the key injection request certificate that is being presented by the renter is made available to the security processor. At 8055, the security processor may validate the authenticity of the key injection request certificate through a public key challenge issued to the certificate authority that signed the certificate, and is thus trusted by the renter. If the security processor establishes that the public key in the key injection request certificate corresponds to a key pair controlled by the certificate authority, the authenticity of the key injection request certificate is established. Embodiments may continue, at 8060, with the security processor retrieving the IHS identity that is specified in the key injection request certificate and validating the integrity of the specified IHS identity against the signature included in the key injection request certificate.

At 8065, the security processor validates the IHS identity from the key injection authorization certificate against the identity information that is included in the key injection request certificate. For instance, the security processor may the same service tag is specified in the IHS identities of the two certificates. If the IHS identities in the certificates match, at 8070, key injection by the renter is authorized. Once key injection has been authorized, at 8075, the key injection request certificate is stored for use by the security processor, such as to a renter slot of the PROM 616. Using this key injection request certificate, renter boot code executed by security processor may be utilized, at 8080, in order to import keys and other security credentials to the security processor. Embodiments may leverage the key injection request certificate in utilizing existing key exchange techniques to import secret key information to the security processor. Using the imported security credentials, the renter may utilize their exclusive control over security processor to implement their own security protocols using their own encryption secrets, thus allowing the renter to establish an independent root of trust in the IHS. With key injection by the renter completed, the security processor may continue use of the renter boot code in the remaining boot procedures described with regard to FIG. 8C that support validation of replaceable hardware components of the IHS, where such validation may utilize cryptographic capabilities of the renter that are supported using credentials imported using the described key injection capabilities.

FIG. 8C is a flowchart of an example, according to some embodiments, of a method for validating the authenticity of replaceable hardware components of an IHS. In scenarios where the motherboard and chassis identities have been validated, and in some cases where key injection by the renter has been configured, at 8085, the renter boot code may determine whether to continue with validation of replaceable hardware components that have been coupled to the IHS. In scenarios where the replaceable hardware of the IHS will be validated, at 8090, the security processor retrieves the renter hardware certificate from a protected memory, such as the PROM 616 of FIG. 6, that may be limited to access by boot code. As with the owner, renter and key injection certificates, the validity of the renter hardware certificate may be similarly determined based on the digital signature included in the certificate.

Using the renter's boot code instructions, at 8095, the security processor may verify the authenticity of the retrieved renter hardware certificate. For instance, such validation procedures may include use of the renter hardware public key included in the renter hardware certificate to generate a challenge that is addressed through the security processor establishing that this public key corresponds to a private renter hardware key that has been permanently stored to a one-time programmable memory, such as the PROM 616 of FIG. 6 during factory provisioning of the IHS.

If the public key in the renter hardware certificate is validated, at block 8100, the security chip may continue use of renter boot code to collect the identity information for the replaceable hardware that is detected as coupled to the IHS. As described, replaceable hardware identifiers may be part number, model numbers or other externally verifiable identifiers that are associated with each respective hardware component. At 8105, the collected identity information is validated against the replaceable hardware identities provided in the body of the renter hardware certificate. In some embodiments, the security chip may validate the integrity of the replaceable hardware identifiers presented in the renter hardware certificate through use of the renter hardware public key included in the certificate to decode the signature included in the certificate. If the decoding of the signature produces the replaceable hardware identifiers included in the certificate, the replaceable hardware identifiers in the certificate are confirmed as authentic.

At 8115, the comparison of the collected replaceable hardware identifiers against the identifiers included in the renter hardware certificate confirms that the replaceable hardware components detected during booting are the same components that were coupled to the IHS during factory assembly or during a trusted administration. With the validity of the replaceable hardware confirmed, at 8120, initialization of the IHS may continue and the IHS may be placed into operation, now with the assurances that the motherboard, chassis and replaceable hardware of the IHS are authentic components installed and provisioned by a trusted administration by the owner of the IHS.

As indicated in FIG. 8C, at 8125, during its ongoing use by the renter, the IHS may be powered cycled. Many of these power cycles will be to reboot the IHS, such as in response to software upgrades or to reinitialized the state of the IHS, or as a result of the IHS being transported or moved to a different location. However, in some instances, a renter may power cycle an IHS in order to administer the replaceable hardware of the IHS, such as to add or remove replaceable hardware. Accordingly, upon each power cycle, at 8130, embodiments may determine whether any such changes have been made by the renter to the replaceable hardware of the IHS. As indicated in FIG. 8C, if no changes to the hardware are detected, the authenticity of each of the detected replaceable hardware components may be validated, starting at 8085, in the manner describe above. In scenarios where changes to the replaceable hardware components of the IHS are detected, embodiments may provide renters with capability by which to generate an updated renter hardware certificate for use in validating the authenticity of the updated set of hardware components during ongoing use of the IHS.

In support of such capabilities, the renter boot code instructions executed by the security chip may continue, at 8135, with the collection of immutable specifications for the updated set of replaceable hardware components that are detected as coupled to the IHS. As described above, the security chip may collect immutable and preferably non-public unique identifiers from some or all of the replaceable hardware components that are detected as coupled to the IHS. Embodiments may continue, at 8140, with the cryptographic capabilities of the security processor being utilized to generate a new renter hardware key pair. The new renter hardware key pair may be generated based on the immutable unique identifiers that are collected by the security chip from the updated set of replaceable hardware. In some embodiments, the generation of the new renter hardware key pair may be additionally or alternatively based on information included in the renter certificate, such as the digital signature. As above, the private key of the new renter hardware key pair may be stored to a one-time programmable memory, PROM, of the security chip.

The renter provisioning of the updated set of replaceable hardware may continue, at 8145, with the security processor, utilizing retrieved renter boot code, collecting information specifying the identity information for each of the set of replaceable hardware components that are now detected as coupled to the IHS after administration by the renter. As described, the hardware identifiers may be a part numbers, model numbers or other externally verifiable identifies for each respective hardware component. Embodiments may continue, at 8150, with the security chip generating a CSR that requests a digital certificate usable to validate the identity of the updated set of replaceable hardware of the IHS once it has been put back into operation by a renter. The security processor includes the public key of the generated new renter hardware keypair in the CSR. The security processor additionally includes the hardware identities for the update set of replaceable hardware in the CSR, such as the collected part numbers or model numbers for each of the replaceable hardware components.

Embodiments may continue, at 8155, the embedded CA of the security chip generating a digital certificate, referred to herein as the new renter hardware certificate, that validates the authenticity of the public key of the new renter hardware key pair and that also includes a digital signature of the identity information for the update set of replaceable hardware. The new renter hardware certificate is signed using the private key of the renter key pair. Upon subsequent power cycles of the IHS by the renter, the validity of the new renter hardware certificate and the replaceable hardware identities specified therein may be confirmed by the security processor. At 8160, the generated new renter hardware certificate is stored according to renter boot code instructions executed by the security processor. Is indicated in FIG. 8C, the new renter hardware certificate may be utilized at each power cycle to validate the authenticity of the replaceable hardware components that are detected.

It should be understood that various operations described herein may be implemented in software executed by processing circuitry, hardware, or a combination thereof. The order in which each operation of a given method is performed may be changed, and various operations may be added, reordered, combined, omitted, modified, etc. It is intended that the invention(s) described herein embrace all such modifications and changes and, accordingly, the above description should be regarded in an illustrative rather than a restrictive sense.

The terms "tangible" and "non-transitory," as used herein, are intended to describe a computer-readable storage medium (or "memory") excluding propagating electromagnetic signals; but are not intended to otherwise limit the type of physical computer-readable storage device that is encompassed by the phrase computer-readable medium or memory. For instance, the terms "non-transitory computer readable medium" or "tangible memory" are intended to encompass types of storage devices that do not necessarily store information permanently, including, for example, RAM. Program instructions and data stored on a tangible computer-accessible storage medium in non-transitory form may afterwards be transmitted by transmission media or signals such as electrical, electromagnetic, or digital signals, which may be conveyed via a communication medium such as a network and/or a wireless link.

Although the invention(s) is/are described herein with reference to specific embodiments, various modifications and changes can be made without departing from the scope of the present invention(s), as set forth in the claims below. Accordingly, the specification and figures are to be regarded in an illustrative rather than a restrictive sense, and all such modifications are intended to be included within the scope of the present invention(s). Any benefits, advantages, or solutions to problems that are described herein with regard to specific embodiments are not intended to be construed as a critical, required, or essential feature or element of any or all the claims.

Unless stated otherwise, terms such as "first" and "second" are used to arbitrarily distinguish between the elements such terms describe. Thus, these terms are not necessarily intended to indicate temporal or other prioritization of such elements. The terms "coupled" or "operably coupled" are defined as connected, although not necessarily directly, and not necessarily mechanically. The terms "a" and "an" are defined as one or more unless stated otherwise. The terms "comprise" (and any form of comprise, such as "comprises" and "comprising"), "have" (and any form of have, such as "has" and "having"), "include" (and any form of include, such as "includes" and "including") and "contain" (and any form of contain, such as "contains" and "containing") are open-ended linking verbs. As a result, a system, device, or apparatus that "comprises," "has," "includes" or "contains" one or more elements possesses those one or more elements but is not limited to possessing only those one or more elements. Similarly, a method or process that "comprises," "has," "includes" or "contains" one or more operations possesses those one or more operations but is not limited to possessing only those one or more operations.

The invention claimed is:

1. A security processor installed in an IHS (Information Handling System), the security processor comprising:
   a logic unit; and
   a memory coupled to the logic unit, the memory having program instructions stored thereon that, upon execution by the logic unit, cause the security processor to:
      as part of a factory provisioning of the IHS for use by a renter, wherein the factory provisioning is conducted as part of a secure manufacture of the IHS:
         store a first signed replaceable hardware certificate that identifies any replaceable hardware components coupled to the IHS during the factory provisioning; and
      upon a transfer of control or ownership of the security processor to the renter:
         identify replaceable hardware components that are detected as coupled to the IHS when used by the renter; and
         utilize the first signed replaceable hardware certificate to validate that the replaceable hardware components detected as coupled to the IHS when used by the renter are the same replaceable hardware components coupled to the IHS during the factory provisioning.

2. The security processor of claim 1, wherein, upon the transfer of control or ownership of the security processor, the execution of the instructions by the logic unit further causes the security processor to: detect a change to the replaceable hardware coupled to the IHS; and initiate boot code operations for generating a second replaceable hardware certificate that identifies the changed replaceable hardware components coupled to the IHS.

3. The security processor of claim 2, wherein the second replaceable hardware certificate is signed by an embedded certificate authority of the security processor.

4. The security processor of claim 2, wherein, upon the transfer of control or ownership of the security processor, the execution of the instructions by the logic unit further causes the security processor to: store the second replaceable hardware certificate for use in validating the authenticity of the replaceable hardware detected as coupled to the IHS upon its next power cycle.

5. The security processor of claim 2, wherein the second replaceable hardware certificate is generated based on instructions validated based on security credentials imported to the IHS by the renter.

6. The security processor of claim 5, wherein the security credentials are imported by the renter based on validation of the IHS being factory provisioned to support secure transfer of security credentials by the renter.

7. The security processor of claim 1, wherein the replaceable hardware components specified in the first signed replaceable hardware certificate are identified based on at least one of part numbers and model numbers assigned to the respective hardware components.

8. The security processor of claim 1, wherein, during a trusted administration of the IHS by an owner of the IHS, the execution of the instructions by the logic unit further causes the security processor to: store a signed third replaceable hardware certificate that identifies replaceable hardware components coupled to the IHS during the trusted administration.

9. The security processor of claim 1, wherein the factory provisioning of the IHS is performed by an owner of the IHS.

10. A memory storage device having program instructions stored thereon that, upon execution by an Information Handling System (IHS), cause the IHS to:
   as part of a factory provisioning of the IHS for use by a renter, wherein the factory provisioning is conducted as part of a secure manufacture of the IHS:
      store a first signed replaceable hardware certificate that identifies any replaceable hardware components coupled to the IHS during the factory provisioning; and
   upon a transfer of control or ownership of the IHS to the renter:
      identify replaceable hardware components that are detected as coupled to the IHS when used by the renter; and utilize the first signed replaceable hardware certificate to validate that the replaceable hardware components detected as coupled to the IHS when used by the renter are the same replaceable hardware components coupled to the IHS during the factory provisioning.

11. The memory storage device of claim 10, wherein, upon the transfer of control or ownership of the IHS, the execution of the instructions by the logic unit further causes the IHS to: detect a change to the replaceable hardware coupled to the IHS; and initiate boot code operations for generating a second replaceable hardware certificate that identifies the changed replaceable hardware components coupled to the IHS.

12. The memory storage device of claim 11, wherein the second replaceable hardware certificate is signed by an embedded certificate authority of a security processor of the IHS.

13. The memory storage device of claim 11, wherein, upon the transfer of control or ownership of the IHS, the execution of the instructions by the logic unit further causes the IHS to: store the second replaceable hardware certificate for use in validating the authenticity of the replaceable hardware detected as coupled to the IHS upon its next power cycle.

14. The memory storage device of claim 10, wherein the replaceable hardware components specified in the first signed replaceable hardware certificate are identified based on at least one of part numbers and model numbers assigned to the respective hardware components.

15. The memory storage device of claim 10, wherein, during a trusted administration of the IHS by an owner of the IHS, the execution of the instructions by the logic unit further causes the IHS to: store a signed third replaceable hardware certificate that identifies replaceable hardware components coupled to the IHS during the trusted administration.

16. A method for securing an Information Handling System (IHS), the method comprising:
as part of a factory provisioning of the IHS for use by a renter, wherein the factory provisioning is conducted as part of a secure manufacture of the IHS:
storing a first signed replaceable hardware certificate that identifies any replaceable hardware components coupled to the IHS during the factory provisioning; and
upon a transfer of control or ownership of the IHS to the renter:
identifying replaceable hardware components that are detected as coupled to the IHS when used by the renter; and
utilizing the first signed replaceable hardware certificate to validate that the replaceable hardware components detected as coupled to the IHS when used by the renter are the same replaceable hardware components coupled to the IHS during the factory provisioning.

17. The method of claim 16, further comprising, upon the transfer of control or ownership of the IHS, detecting a change to the replaceable hardware coupled to the IHS and initiating boot code operations for generating a second replaceable hardware certificate that identifies the changed replaceable hardware components coupled to the IHS.

18. The method of claim 17, wherein the second replaceable hardware certificate is signed by an embedded certificate authority of a security processor of the IHS.

19. The method of claim 17, further comprising, upon the transfer of control or ownership of the IHS, storing the second replaceable hardware certificate for use in validating the authenticity of the replaceable hardware detected as coupled to the IHS upon its next power cycle.

20. The method of claim 17, further comprising, during a trusted administration of the IHS by an owner of the IHS, storing a signed third replaceable hardware certificate that identifies replaceable hardware components coupled to the IHS during the trusted administration.

\* \* \* \* \*